(12) United States Patent
Iwanaga

(10) Patent No.: US 8,342,697 B2
(45) Date of Patent: Jan. 1, 2013

(54) LIGHT SOURCE UNIT AND PROJECTOR

(75) Inventor: Masakuni Iwanaga, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 295 days.

(21) Appl. No.: 12/882,358

(22) Filed: Sep. 15, 2010

(65) Prior Publication Data

US 2011/0063581 A1   Mar. 17, 2011

(30) Foreign Application Priority Data

Sep. 15, 2009   (JP) .................................. 2009-213127

(51) Int. Cl.
*G03B 21/14*   (2006.01)
(52) U.S. Cl. .............. 353/94; 353/84; 353/85; 348/743; 362/231
(58) Field of Classification Search ..................... 353/31, 353/34, 37, 85, 94; 349/5, 7, 8, 9; 362/231, 362/234; 348/742, 743, 771
See application file for complete search history.

(56) References Cited

U.S. PATENT DOCUMENTS

| | | | | |
|---|---|---|---|---|
| 7,832,876 B2 * | 11/2010 | Yagyu | ............................. | 353/94 |
| 8,052,279 B2 * | 11/2011 | Wang et al. | ..................... | 353/31 |
| 8,167,440 B2 * | 5/2012 | Sato et al. | ........................ | 353/99 |
| 2009/0141189 A1 * | 6/2009 | Shirai et al. | .................... | 348/743 |
| 2012/0050691 A1 * | 3/2012 | Tsuda et al. | .................... | 353/31 |

FOREIGN PATENT DOCUMENTS

JP   2004-341105 A   12/2004

* cited by examiner

*Primary Examiner* — William C Dowling
(74) *Attorney, Agent, or Firm* — Holtz, Holtz, Goodman & Chick, PC

(57) ABSTRACT

To provide a light source unit which can enhance luminance and a projector, a projector of the invention includes a light source unit comprising a luminescent wheel with luminescent light emitting portions to emit blue and green rays, a primary light source shining an excitation light to the luminescent light emitting portions, a secondary light source emitting a red ray, a light guiding optical system guiding the rays from the luminescent wheel and the ray from the secondary light source to the same optical path and a light source control means controlling the emissions from the respective light sources, wherein the light source control means turns on the secondary light source when the ray from the primary light source is shone onto a boundary between the luminescent light emitting portions to synthesize the rays from the luminescent wheel and the ray from the secondary light source to generate white ray.

14 Claims, 13 Drawing Sheets

FIG. 8

| WHEEL ANGLE [°] | 0 | 45 | 90 | 135 | 180 | 225 | 270 | 315 | 0 (360) | 45 |
|---|---|---|---|---|---|---|---|---|---|---|
| TURNING-ON RANGE | | PRIMARY LIGHT SOURCE TURNING-ON RANGE L1 | | PRIMARY SECONDARY LIGHT SOURCE TURNING-ON RANGE L2 | | PRIMARY LIGHT SOURCE TURNING-ON RANGE L1 | | | PRIMARY AND SECONDARY LIGHT SOURCES TURNING-ON RANGE L12 | |
| EMITTED LIGHT | W | | G | | R | | B | | W | |
| PRIMARY LIGHT SOURCE (ON/OFF) | | | | | | | | | | |
| SECONDARY LIGHT SOURCE (ON/OFF) | | | | | | | | | | |

LIGHT SOURCE UNIT AND PROJECTOR

CROSS-REFERENCE TO RELATED APPLICATIONS

This application is based upon and claims the benefit of priority under 35 USC 119 of Japanese Patent Application No. 2009-213127 filed on Sep. 15, 2009, the entire disclosure of which, including the description, claims, drawings and abstract thereof, is incorporated herein by reference.

BACKGROUND OF THE INVENTION

1. Field of the Invention

The present invention relates to a light source unit and a projector which includes the light source unit.

2. Description of the Related Art

In these days, data projectors are used on many cases as image projection apparatuses which project images including images of screens and video images of personal computers, as well as images based on image data which is stored in memory cards on to a screen. These projectors are such that light emitted from a light source is collected to a micromirror device called DMD (Digital Micromirror Device) or a liquid crystal plate for display of a color image onto the screen.

In projectors of the type described above, conventionally, projectors using a high-intensity discharge lamp as a light source have been the mainstream of projectors. In recent years, however, there have been made many developments and proposals on light source units which utilize a semiconductor light emitting device such as a light emitting diode (LED), a laser diode (LD), or a device utilizing organic EL technology, luminescent emission as a light emitting device of a light source unit. For example, Japanese Unexamined Patent Publication No. 2004-341105 (JP-A-2004-341105) proposes a light source unit having a luminescent wheel and a solid-state light source, the luminescent wheel being made of a circular disk-shaped transparent base material on which luminescent material layers are disposed which receive ultraviolet rays emitted from the solid-state light source as excitation light to convert them into visible light.

In the proposal described in JP-A-2004-341105, ultraviolet rays are shone as excitation light on to the luminescent material layers formed on a surface of the luminescent wheel, whereby the luminescent material layers become luminous so as to emit luminescent light rays of red, green and blue wavelength bands. However, the luminous efficiency of the red luminescent material is lower than those of the other luminescent materials. Due to this, in the event that respective ratios of the luminescent material layers which are disposed in a circumferential direction of the luminescent wheel are made substantially the same, there is caused a problem that the luminance of red becomes insufficient.

SUMMARY OF THE INVENTION

The invention has been made in view of the problem inherent in the related art and an object thereof is to provide a light source unit which can increase the luminance of a screen by including a light source which excites luminescent materials, a light emitting member having types of luminescent materials with good luminance efficiencies, and a single-color light source which emits light of a predetermined wavelength band which corresponds to a type of luminescent material with a relatively low luminance efficiency, and a projector including the light source unit.

According to an aspect of the invention, there is provided a light source unit comprising a primary light source which emits a light ray of a predetermined wavelength band, a light emitting member having a plurality of segment areas on a base material and in which the plurality of segment areas emit sequentially light rays of different wavelength bands by the light from the primary light source being shone on to the plurality of segment areas, a secondary light source which emits a light ray of a wavelength band which is different from that of the light ray emitted from the primary light source and those of the light rays emitted from the light emitting member, a light guiding optical system which guides the light rays emitted from the light emitting body and the light ray emitted from the secondary light source to the same optical path, and a light source control means which controls the primary light source and the secondary light source individually, wherein the light source control means controls the primary light source and the secondary light source to be turned on so that a period of time may be included when the light ray from the primary light source is shone on to a predetermined boundary between the adjacent segment areas of the light emitting body when the secondary light source is turned on.

The light emitting body is a luminescent light emitting portion in which at least one of the plurality segment areas has a luminescent material layer which receives the light ray from the primary light source to emit a light ray of a wavelength band which differs from that of the light ray from the primary light source.

The primary light source is a laser emitter which emits a laser beam of an ultraviolet radiation range.

The luminescent materials which are disposed in the plurality of segment areas of the light emitting member are a luminescent material which receives the light ray from the primary light source to emit at least a light ray of blue wavelength band and a luminescent material which receives the light ray from the primary light source to emit a light ray of green wavelength band.

The primary light source is a laser emitter which emits a laser beam of blue wavelength band, and at least one of the plurality of segment areas of the light emitting member is configured as a transmissive portion which transmits the light ray from the primary light source.

As this occurs, the luminescent material of the light emitting member is the luminescent material which receives the light ray from the primary light source to emit at least a light ray of green wavelength band.

A diffuse layer which diffuses the light ray from the primary light source may be formed on the transmissive portion of the light emitting member.

Further, the base material with the luminescent light emitting portion on which the luminescent material layers are disposed is a transparent base material which transmits light, and the light guiding optical system is such that a dichroic mirror which transmits the light rays from the light emitting member and reflects the light ray from the secondary light source or which reflects the light rays from the light emitting member and transmits the light ray from the secondary light source is disposed in a position where an optical axis of the primary light source and an optical axis of the secondary light source intersect each other.

A dichroic layer which transmits the light ray from the primary light source and reflects light rays of other wavelength bands is formed on a surface of the luminescent light emitting portion on which the luminescent material layer is disposed.

The base material of the luminescent light emitting portion where the luminescent layers are disposed is a reflecting plate having a reflecting surface which reflects light, and the light guiding optical system may have a dichroic mirror which is disposed between the primary light source and the light emitting member so as to transmit the light ray from the primary light source while reflecting the luminescent light rays from the luminescent materials and pluralities of reflecting mirrors and dichroic mirrors which collect the light ray that passes through the transmissive portion of the light emitting body, the luminescent light rays that are reflected on the dichroic mirror and the light ray that is emitted from the secondary light source to the same optical path and which enables those light rays to be emitted towards the same direction.

The secondary light source is a light emitting diode which emits a light ray of red wavelength band.

The light emitting body is a luminescent wheel which is made up of a rotation-controllable base material.

Further, the light emitting body has two segment areas which are laid to be adjacent to each other. Preferably the light source control means turns on the secondary light source as well when the primary light source is turned on to shine a light ray so that a period of time is included when an illumination area passes through a boundary between the two segment areas at one of boundaries between the two segments, whereby the light source unit emits a light ray that is synthesized from the light rays of two different wavelength bands which are emitted from the light emitting member and the light ray from the secondary light source at the one boundary between the two segments, and also the light source control means turns off the primary light source so that a non-illumination area passes through the boundary between the two segment areas at the other boundary between the two segments and then turns on the secondary light source, whereby the light source unit emits only the light ray from the secondary light source.

According to another aspect of the invention, there is provided a projector comprising any of the light sources described above, a display device, a light source-side optical system which guides a light ray from the light source unit to the display device, a projection-side optical system which projects an image emitted from the display device on to a screen, and a projector control means which controls the light source unit and the display device.

According to the invention, the light source unit includes the excitation light source, the light emitting member and the single-color light source, so that the luminescent light rays are excited by the light ray from the excitation light source. The luminescent materials with good luminous efficiency are provided on the light emitting member, whereas a luminescent material with relatively low luminous efficiency is not formed on the light emitting member. Instead, the single-color light source can be provided which emits a light ray of a wavelength band which corresponds to the luminescent light with low luminous efficiency. Thus, the invention can provide the light source unit which can enhance the luminance of a screen and the projector which includes the light source unit.

In addition, the secondary light source is turned on when the primary light source is turned on to shine a light ray so that the illumination area passes through the boundary between the segment areas of the luminescent light emitting portion such as the light emitting member to thereby synthesize the light rays of two different wavelength bands which are emitted from the light emitting member and the light ray of wavelength band which is emitted from the primary light source. Thus, the invention can provide the light source unit which can enhance further the luminance of the screen and the projector which includes the light source unit.

BRIEF DESCRIPTION OF THE DRAWINGS

The invention will be understood much sufficiently by reading the following detailed description thereof and referring to the accompanying drawings. However, the detailed description and the accompanying drawings are intended mainly to describe the invention and are not intended to limit the scope thereof. In the accompanying drawings;

FIG. 8 is a time chart showing timings at which the primary light source and the secondary light source are turned on and off by a light source control means according to the embodiment of the invention.

DETAILED DESCRIPTION OF THE PREFERRED EMBODIMENT

Figure 1:
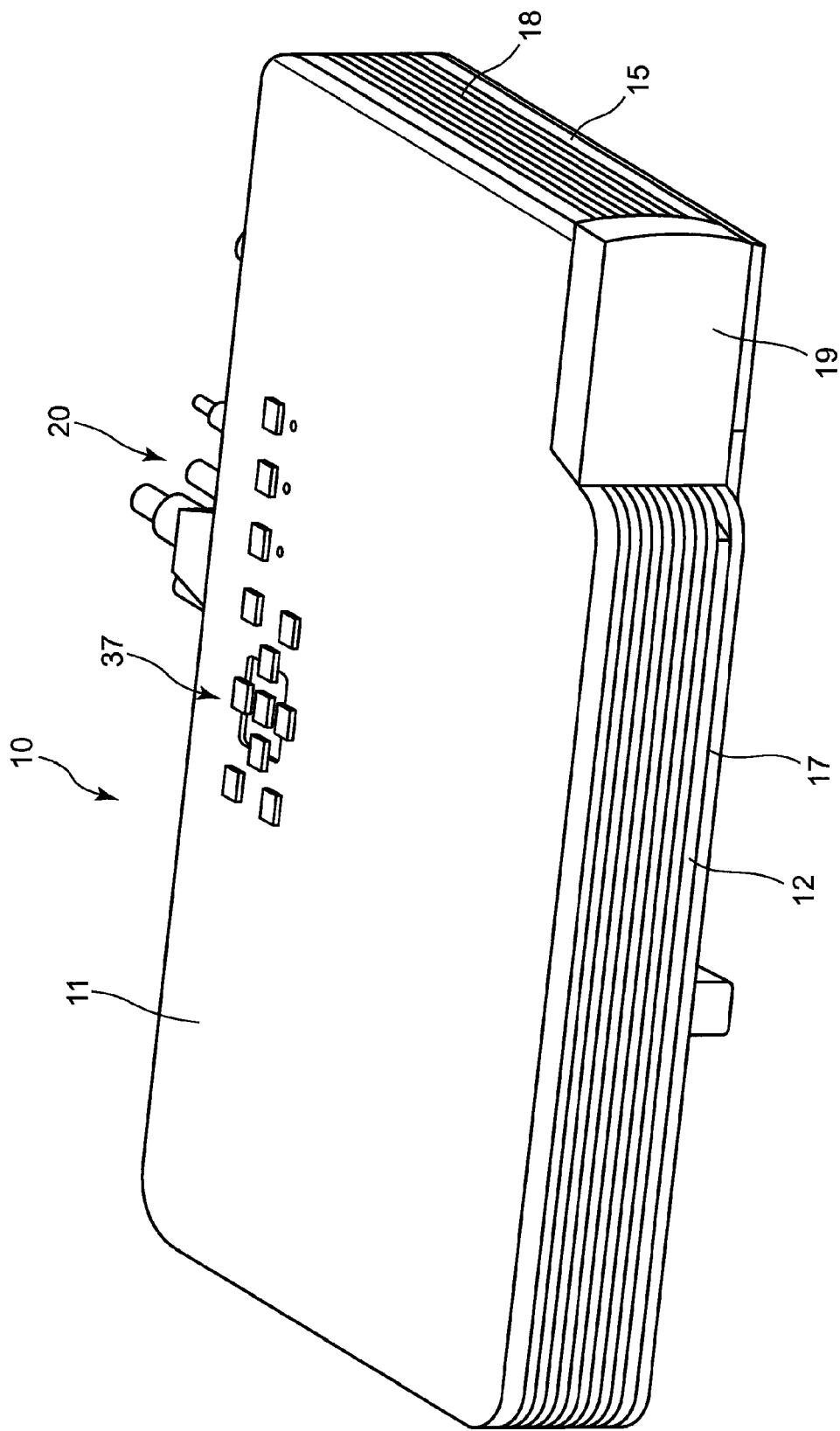
FIG. 1 is a perspective view showing an external appearance of a projector including a light source unit according to an embodiment of the invention.

Hereinafter, a preferred mode for carrying out the invention will be described by use of the accompanying drawings. Although various limitations which are technically preferable for carrying out the invention are imposed on an embodiment which will be described below, the scope of the invention is not limited in any way to the following description and illustrated examples.

Hereinafter, a mode for carrying out the embodiment will be described. A projector 10 includes a light source unit 63, a display device 51, a cooling fan, a light source-side optical system 62 for guiding a light ray from the light source unit 63 to the display device 51, a projection-side optical system 90 for projecting an image emitted from the display device 51 on to a screen, a projector control means for controlling the light source unit 63 and the display device 51 and a light source control circuit 41 for controlling individually the emission of a primary light source 72 and a secondary light source 82.

The light source unit 63 further includes a luminescent wheel 71 as a light emitting member, the primary light source 72 and the secondary light source 82 and a light guiding optical system. The luminescent wheel 71 is a light emitting member in which a transparent base material which transmits light is formed into a circular disk shape and whose rotation can be controlled. In addition, the luminescent wheel 71 has two semicircular segment areas which are laid adjacently to each other. One of the segment areas is configured as a luminescent light emitting portion 1B having a luminescent material layer 131B which receives an excitation light ray emitted from the primary light source 72 as excitation light to emit a light ray of blue wavelength band, and the other is configured as a luminescent light emitting portion 1G having a luminescent material layer 131G which receives the light ray emitted from the primary light source 72 as excitation light to emit a light ray of green wavelength band. Namely, when the light ray from the primary light source 72 is shone onto the luminescent wheel 71 which is rotating at predetermined timings, the light ray of blue wavelength band and the light ray of green wavelength band are emitted sequentially from the blue luminescent light emitting portion 1B and the green luminescent light emitting portion 1G which receive the light ray.

The transparent base material of the luminescent wheel 71 is formed of a glass base material or a transparent resin base material. A dichroic layer 132 is formed through coating on a surface of a side of the base material where the luminescent material layer 131 which includes the luminescent material layers 131B, 131G is disposed. The dichroic layer 132 transmits the excitation light from the primary light source 72 and reflects light rays of other wavelength bands. Further, a non-reflecting coated layer is formed through coating on a surface of an opposite side of the base material to the side where the luminescent layer 131 is disposed.

The primary light source 72 is a laser emitter which emits a light ray of an ultraviolet light range whose wavelength is shorter than those of the light rays of blue and green wavelength bands emitted from a blue luminescent material layer 131B and a green luminescent material layer 131G, respectively. This primary light source 72 is disposed so as to shine its light on to the luminescent material layer 131 which is disposed on the luminescent wheel 71.

The secondary light source 82 is a light emitting diode which emits a light ray of red wavelength band which is different from the blue luminescent light ray and the green luminescent light ray which are emitted from the luminescent material layer 131 of the luminescent wheel 71 and the ultraviolet light ray emitted from the primary light source 72.

The light guiding optical system is an optical system for collecting the light rays emitted from the luminescent wheel 71 and the light ray emitted from the secondary light source 82 to the same optical path. This light guiding optical system has a dichroic mirror 151 in a position where an optical axis of the primary light source 72 and an optical axis of the secondary light source intersect each other. This dichroic mirror 151 transmits the blue luminescent light ray and the green luminescent light ray which are emitted from the luminescent wheel 71 and reflects the light ray from the secondary light source 82. This dichroic mirror 151 is disposed on an emanating side of the luminescent wheel 71 from which the luminescent light rays emanate so as to prevent the light ray from the secondary light source 82 from being shone on to the luminescent wheel 71 from the secondary light source 82.

The light source control means controls to turn on the secondary light source 82 when the primary light source 72 is turned on to shine a light ray so that an illumination area 7 extends between the two segment areas at one of boundaries of the two segment areas, that is, a period of time is included when the illumination area passes through the boundary between the two segment areas. By doing this, a white light ray is emitted from the light source unit 63 into which the blue luminescent light ray and the green luminescent light ray which are emitted from the luminescent wheel 71 and the red light source light ray which is emitted from the secondary light source 82 are synthesized Further, the light source control means controls to turn on the secondary light source 82 when the primary light source 72 is turned off so as to prevent a synthesized light ray synthesized from the light rays of two different (blue and green) wavelength bands being emitted from the luminescent wheel 71 as a result of the primary light source 72 shining the light ray so that the illumination area 7 extends between the two segment areas at the other boundary between the two segment areas. Namely, the light source unit 63 can emit only the light ray of red wavelength band from the secondary light source 82 by turning on the secondary light source 82 when the primary light source 72 is turned off so a period of time is included when a non-illumination area passes through the boundary between the two segments.

Hereinafter, an embodiment of the invention will be described in detail by reference to the accompanying drawings.

FIG. 1 is a perspective view showing an external appearance of a projector 10. In this embodiment, left and right denote, respectively, left and right directions with respect to a projecting direction, and front and rear denote, respectively, front and rear directions with respect to a traveling direction of a pencil of light that is emitted from the projector 10. As is shown in FIG. 1, the projector 10 has a substantially rectangular parallelepiped shape and has a lens cover 19 which covers a projection port which lies to a side of a front panel 12 which is referred to as a front side panel of a main body case, as well as a plurality of inside air outlet port 17 in the front panel 12. Further, although not shown, the projector 10 includes an Ir reception part for receiving a control signal from a remote controller.

In addition, a keys/indicators part 37 is provided on an upper side panel 11 which makes up the main body case. Disposed on this keys/indicators part 37 are keys and indicators which include a power supply switch key, a power indicator which informs whether the power supply is on or off, a projection switch key which switches on or off projection, an overheat indicator which informs of an overheat condition when the light source unit, the display device or the control circuit overheats and the like.

Further, provided on a back side or a back side panel of the main body case are an input/output connectors part where USB terminals, an image signal input D-SUB terminal, an S terminal, an RCA terminal and the like are provided and various types of terminals 20 including a power supply adaptor plug and the like. A plurality of outside air inlet port 18 are formed in proximity to respective lower portions of a right-hand side panel 14 which configures a side panel, not shown, of the main body case and a left-hand side panel 15 which is a side panel shown in FIG. 1.

Figure 2:
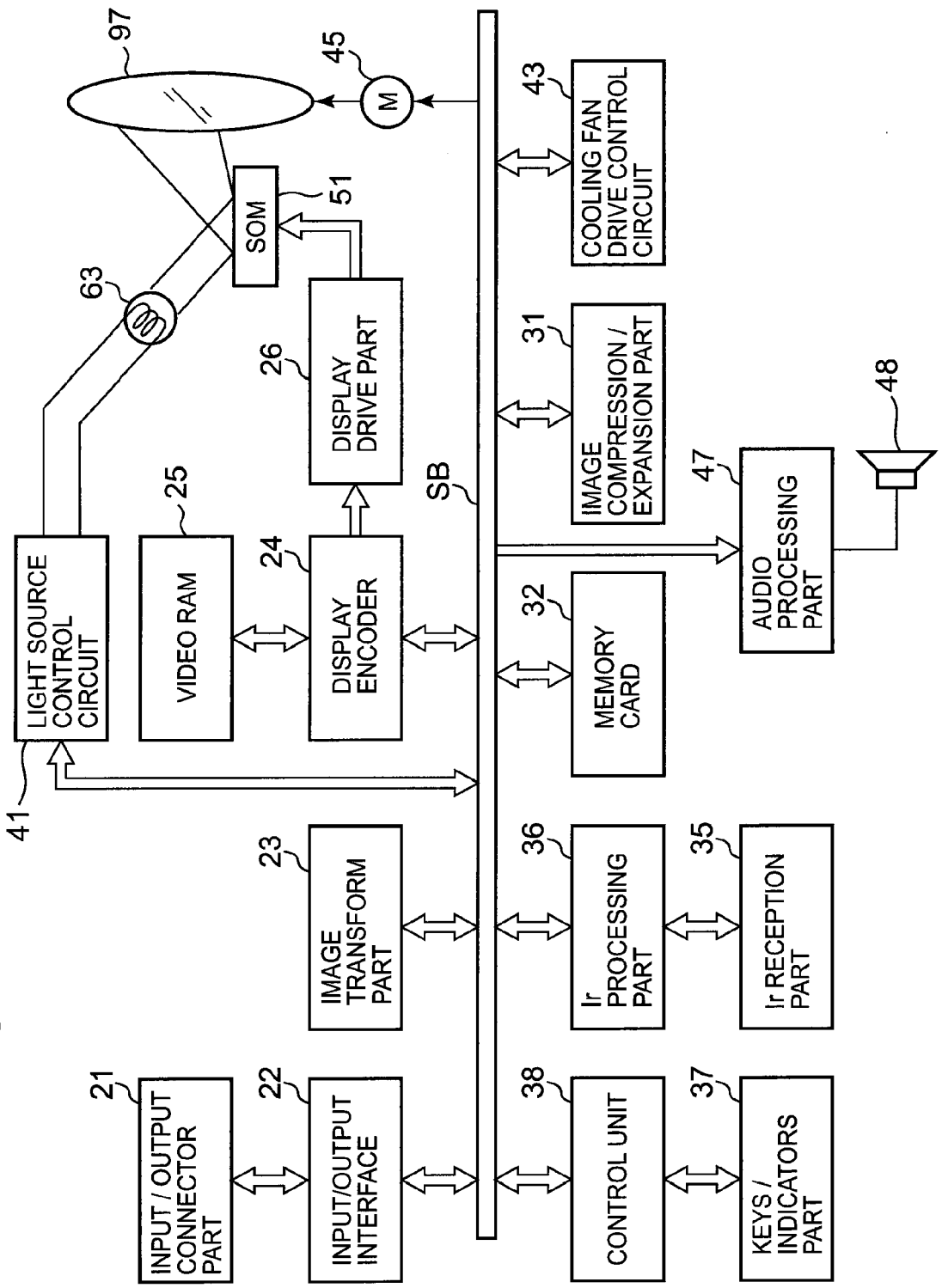
FIG. 2 is a functional circuit block diagram of the projector including the light source unit according to the embodiment of the invention.

Next, a projector control means for the projector 10 will be described by use of a block diagram in FIG. 2. The projector control means includes a control unit 38, an input/output interface 22, an image transform part 23, a display encoder 24, a display drive part 26 and the like.

The control unit 38 governs the control of respective operations of circuitries within the projector 10 and is made up of a CPU, a ROM which stores in a fixed fashion operation programs of various types of settings and a RAM which is used as a work memory.

Image signals of various standards that are inputted from the input/output connector part 21 are sent via the input/output interface 22 and a system bus (SB) to the image transform part 23 where the image signals are transformed so as to be unified into an image signal of a predetermined format which is suitable for display. Thereafter, the image signals so transformed are outputted to the display encoder 24.

In addition, the display encoder 24 deploys the image signals entered thereinto on a video RAM 25 for storage therein and generates a video signal from the contents stored in the video RAM 25, outputting the video signal so generated to the display drive part 26.

The display drive part 26 drives a display device 51 which is a spatial optical modulator (SOM) at an appropriate frame rate in accordance with the image signal outputted from the display encoder 24. A pencil of light or rays which are emitted from a light source unit 63 are inputted into the display device 51, which is controlled by the display drive part 26, via a light source-side optical system to thereby form an optical image by reflected light reflected at the display device 51, and the image so formed can be projected on to a screen, not shown, for display via a projection side lens group which is configured as a projection-side optical system. A movable lens group 97 of the projection-side optical system is driven by a lens motor 45 for zooming or focusing.

In addition, an image compression/expansion part 31 performs a recording operation in which a luminance signal and a color difference signal of an image signal is data-compressed through ADCT and Huffman effect and the compressed data is sequentially written on a memory card 32 which is configured as a detachable recording medium. The image compression/expansion part 31 further performs an operation in which when in a reproducing mode, the image compression/expansion part 31 reads out image data recorded on the memory card 32 and expands individual image data which make up a series of dynamic images frame by frame. Then, the image data is outputted to the display encoder 24 via the image transforming part 23 so as to enable the display of dynamic images on the basis of the image data stored on the memory card 32. Operation signals generated at the keys/indicators part 37 which is made up of the main keys and indicators provided on the upper side panel 21 of the main body case are sent out directly to the control unit 38, while key operation signals generated by operating keys on the remote controller are received by the Ir reception part 35, and a code signal demodulated at an Ir processing part 36 is outputted to the control unit 38.

In addition, a audio processing part 47 is connected to the control unit 38 via the system bus (SB). This audio processing part 47 includes a sound source circuit such as a PCM sound source. When a projection mode and a reproducing mode are performed, the audio processing part 47 converts audio data into analog signals and drives a speaker 48 to output loudly sound or voice based on the audio data.

Additionally, the control unit 38 controls a light source control circuit 41 which is configured as a light source control means. This light source control circuit 41 controls a primary light source and a secondary light source of a light source unit 63 individually in accordance with an image signal. Further, the control unit 38 causes a cooling fan drive control circuit 43 to detect temperatures through a plurality of sensors which are provided at the light source unit 63 and the like so as to control the rotational speed of the cooling fan based on the results of the temperature detection. In addition, the control unit 38 also causes the cooling fan drive control circuit 43 to make the cooling fan continue to rotate even after the power supply of the projector main body is switched off by use of a timer or the like or to make the power supply to the projector main body be cut off depending upon the results of the temperature detection by the temperature sensors.

Figure 3:
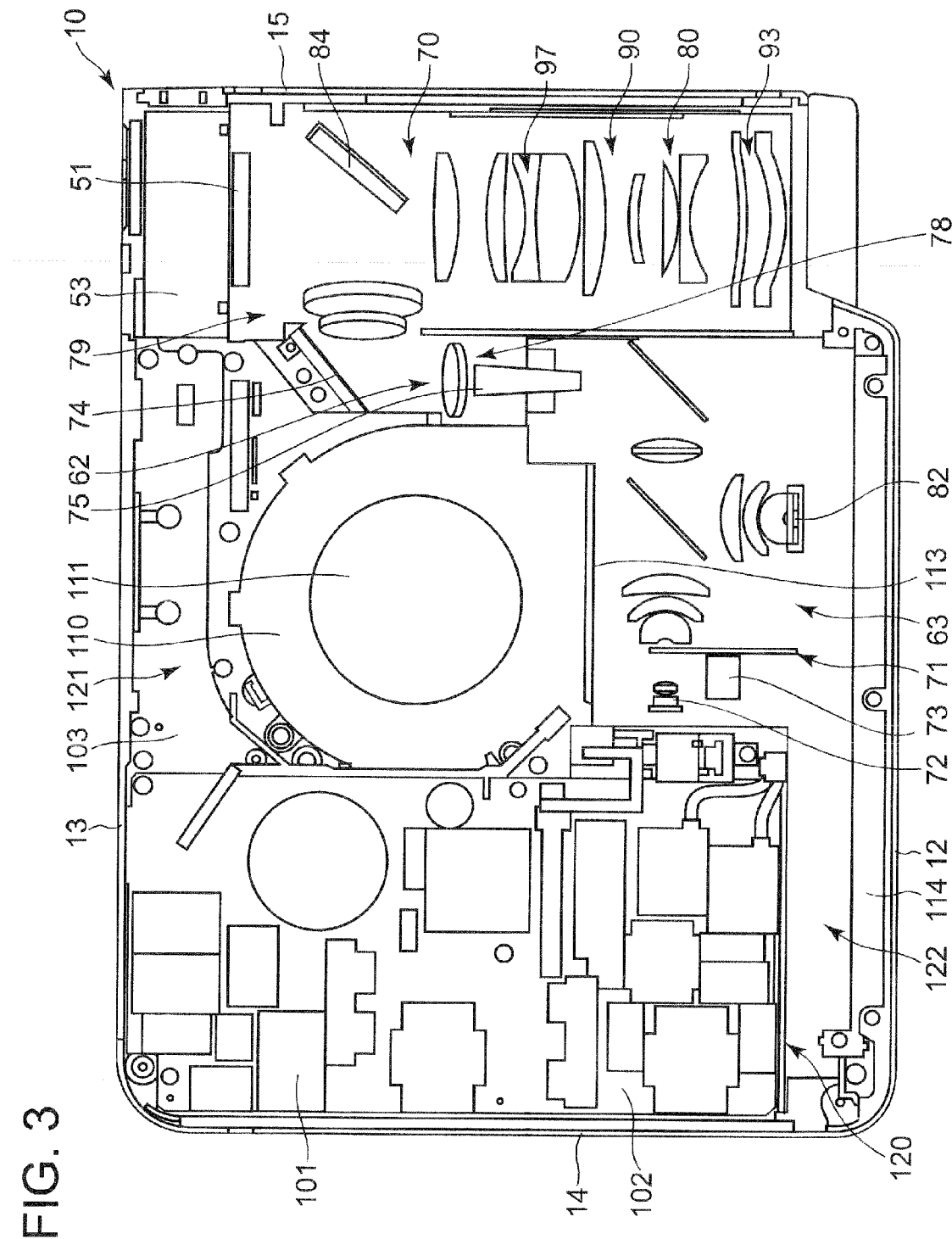
FIG. 3 is an exemplary plan view showing an internal construction of the projector including the light source unit according to the embodiment of the invention.

Next, an internal construction of the projector 10 will be described. FIG. 3 is an exemplary plan view showing an internal construction of the projector 10. As is shown in FIG. 3, in the projector 10, a light source control circuit board 102 is disposed in proximity to the right-hand side panel 14 and a power supply circuit block 101 and the like are mounted on this power supply control circuit board 102. A sirocco fan-type blower 110 is disposed substantial at a center in the projector 10, and a control circuit board 103 is disposed in proximity to the blower 110. The light source 63 is disposed in proximity to the front panel 12, and an optical system unit 70 is disposed in proximity to the left-hand side panel 15. Additionally, an interior of the housing of the projector 10 is divided airtightly into an inlet-side space compartment 121 which lies on the back panel 13 side and an outlet side space compartment 122 which lies on the front panel 12 side by a partitioning bulkhead 120. The blower 110 is disposed so that an outside air inlet port 111 is positioned in the inlet-side space compartment 121 and an outside air outlet port 113 is positioned on a boundary between the outlet-side space compartment 122 and the inlet-side space compartment 121.

The optical system unit 70 has a substantially U-shape and includes three blocks such as an illumination-side block 78 which is positioned in proximity to the light source unit 63, an image generation block 79 which is positioned on the back panel 13 side, and a projection side block 80 which is positioned between the illumination-side block 78 and the left-hand side panel 15.

The illumination-side block 78 includes a part of a light source-side optical system 62 which guides light emitted from the light source unit 63 to the display device 51 which is included in the image generation block 79. The part of the light source-side optical system 62 that is included in the illumination-side block 78 includes a light smoothing or light guiding unit 75 for making rays emitted from the light source 63 into rays whose intensity is uniformly distributed and a collective lens for collecting rays that have passed through the light guiding unit 75 for concentration.

The image generating block 79 has, as the light source-side optical system 62, an optical axis altering mirror 74 for altering directions of optical axes of rays that have emanated from the light guiding unit 75, a plurality of collective lenses for collecting the rays reflected by the optical axis altering mirror 74 so as to converge on to the display device 51 and a shining mirror 84 for shining the rays that have passed through the collective lenses on to the display device 51 at a predetermined angle. Further, the image generating block 79 includes a DMD which is configured as the display device 51, and a display device heatsink or cooling device 53 for cooling the display device 51 is disposed on a back panel 13 side of the display device 51 to thereby prevent the display device 51 from being heated to a high temperature.

The projection side block 80 has a lens group of a projection-side optical system 90 which projects light reflected by the display device 51 on to the screen to form an image. The projection side optical system 90 is configured as a variable focus lens including a fixed lens group 93 which is incorporated in a fixed lens barrel and a movable lens group 97 which is incorporated in a movable lens barrel, whereby the projection-side optical system 90 is provided with a zooming function. This variable focus lens enables zooming and focusing operations by moving the movable lens group 97 by a lens motor.

In the interior construction of the projector 10, members whose temperatures are lower than that of the light source unit 63 are disposed within the inlet-side space compartment 121. Specifically, disposed in the inlet-side space compartment 121 are the light source control circuit board 102, the blower 110, the control circuit board 103, the image generating block 79 of the optical system unit 70, the projection-side block 80 of the optical system 70, and the collective lens in the illumination-side block 78.

On the other hand, the light source unit 63, which is heated to a relatively high temperature, the light guiding unit 75 included in the illumination-side block 78 and an outlet air temperature reducing device 114.

The light source unit 63 includes a luminescent wheel 71, a wheel motor 73, a primary light source 72 and a secondary light source 82 and a light guiding optical system. This luminescent wheel 71 is a light emitting member which receives a light ray of a predetermined wavelength band which is emitted from the primary light source 72 and emits light rays of wavelength bands of green and blue which part of the primary colors. The wheel motor 73 is controlled by the control unit 38 of the projector control unit so as to drive to rotate the luminescent wheel 71. The primary light source 72 is a laser emitter which emits a light ray of an ultraviolet light range and is disposed so as to shine its light on to luminescent material layers on the luminescent wheel 71. The secondary light source 82 is a light emitting diode which emits a light ray of a wavelength band of red which is part of the primary colors.

The primary light source 72 and the secondary light source 82 will be described. The primary light source 72 shines its light on to a luminescent material layer which is formed in proximity to an outer circumferential portion of the luminescent wheel 71. This luminescent material layer contains luminescent materials which emit light rays of blue and green wavelength bands, which will be described later. The primary light source 72 shines an invisible light of an ultraviolet light range whose wavelength is shorter than those of the luminescent light rays of the luminescent materials on to the luminescent material layers. Consequently, the luminescent materials are caused to absorb the light ray of ultraviolet light range as excitation light, thereby making it possible to make the luminescent materials luminous with good efficiency.

The secondary light source 82 emits a light ray of red wavelength band which is different from the blue and green luminescent light rays which are emitted from the luminescent material layer on the luminescent wheel 71 and the light ray of ultraviolet light range which is emitted from the primary light source 72. In this way, by providing separately the red light source without providing a layer of a red luminescent material with relatively low luminous efficiency, the red light ray which matches a quantity of light emitted from the blue and green luminescent materials with relatively high luminous efficiency, thereby making it possible to realize an increase in luminance of the screen.

Figure 4A:
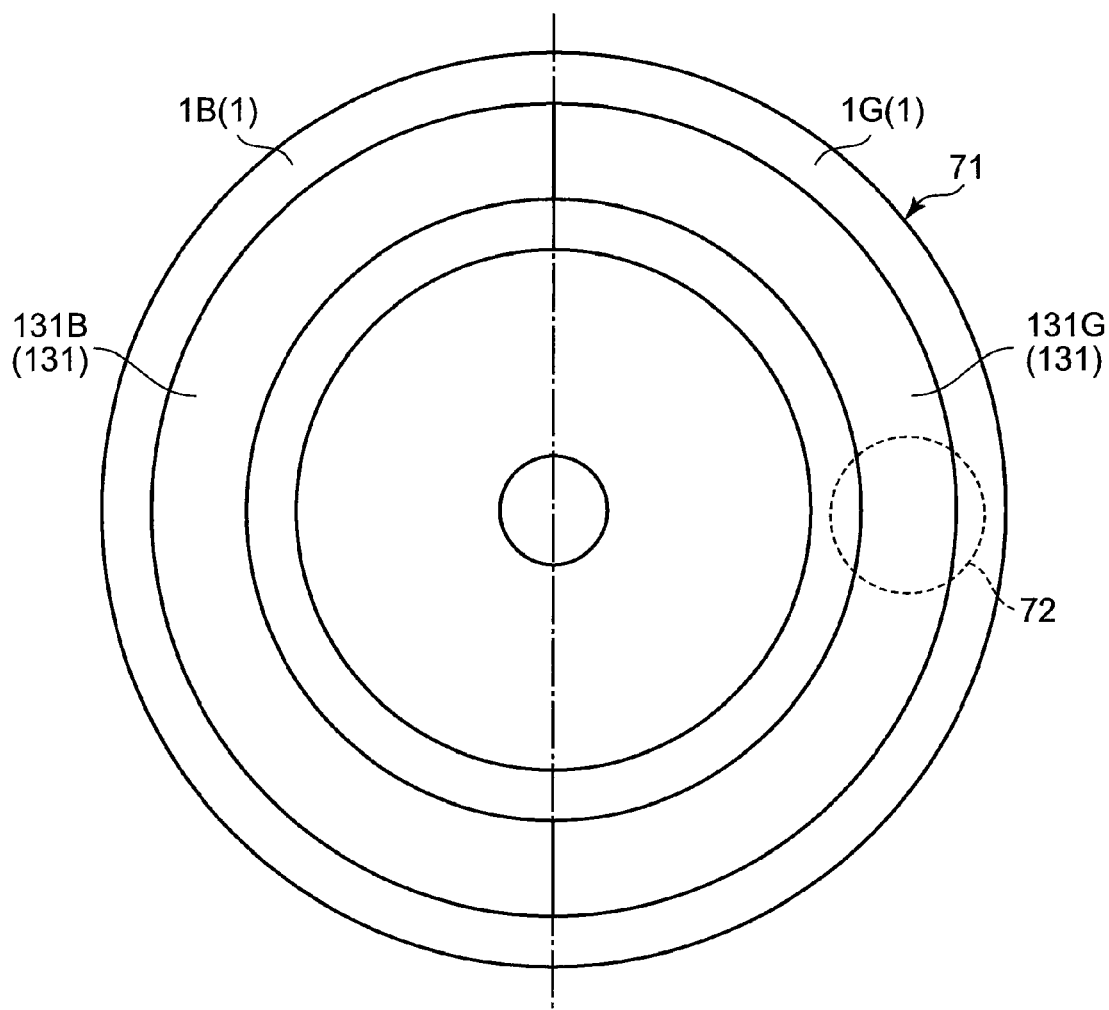
FIG. 4A is an exemplary front view of a luminescent wheel as a light emitting member according to the embodiment of the invention.
Figure 4B:
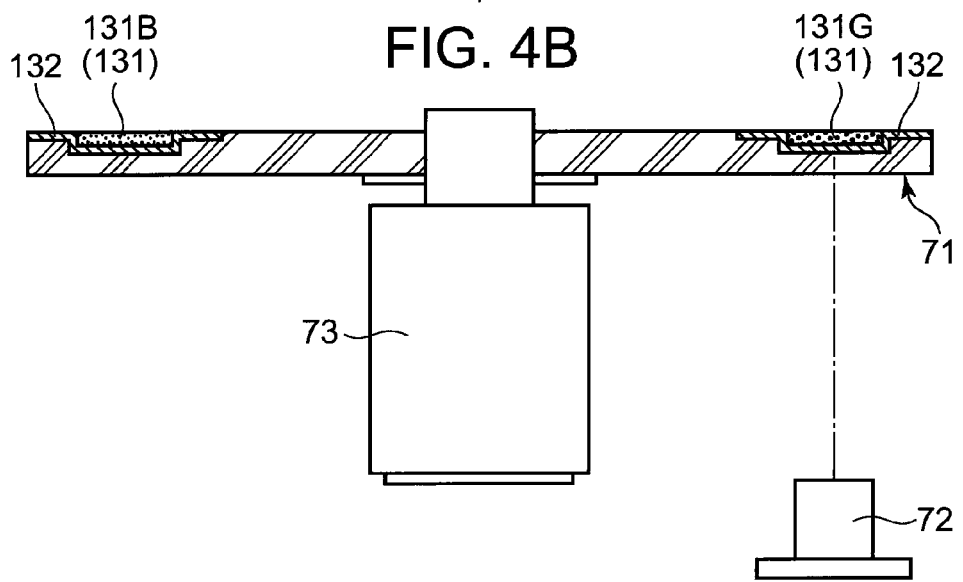
FIG. 4B is an exemplary partially sectional plan view of the luminescent wheel.

Next, referring to FIG. 4, the luminescent wheel 71 will be described. This luminescent wheel 71 is made of a thin, circular transparent base material which includes a luminescent material layer 131. The transparent base material is a glass base material or a transparent resin base material which transmits light. A circular opening, which corresponds to a shape of a rotating shaft of the wheel motor 73, is formed in a central portion of the base. The rotating shaft is securely inserted in the circular opening and a motor hub is bonded to a position on the transparent base material which lies in proximity to the central portion, whereby the luminescent wheel 71 is strongly connected to the rotating shaft of the motor 73.

Consequently, this luminescent wheel 71 is rotated in a circumferential direction at a rotational speed of about 120 revolutions per second by the wheel motor 73 which is controlled by the control unit 38 of the projector control means. Namely, the rotation of this luminescent wheel 71 can be controlled by the control unit 38 via the wheel motor 73.

The luminescent wheel 71 has two semicircular segment areas which lie adjacent to each other. One of the segment areas is configured as a blue luminescent light emitting portion 1B having a luminescent material layer 131B which receives a light ray of the primary light source 72 as excitation light to emit a light ray of blue wavelength band. The other segment area is configured as a green light emitting portion 1G having a luminescent material layer 131G which receives the light ray of the primary light source 72 as excitation light to emit a light ray of green wavelength band.

A belt-like recessed portion is formed in proximity to an outer circumferential portion of a luminescent light emitting portion 1 of a transparent base material, which includes the blue and green luminescent light emitting portions 1B, 1G, and a luminescent material layer 131 which includes the blue and green luminescent material layer 131B, 131G is formed in the recessed portion. The luminescent material layers 131B, 131G are layers which contain luminescent materials which receive a light ray from the primary light source 72 and absorb it as excitation light to emit light rays of wavelength bands of blue and green, which constitute part of the primary colors. The luminescent wheel 71 functions as a light emitting member which emits light rays of blue and green wavelength bands by the luminescent material layer 131 being formed in the way described above. This luminescent material layer 131 is made of luminescent material crystals and a binder.

A dichroic layer 132 is formed through coating on a surface of a portion of the base material where the luminescent material layer 131 is disposed, and the dichroic layer 132 transmits the light ray from the primary light source 72 and reflects light rays of other wavelength bands. Namely, the luminescent material layer 131 is formed on the dichroic layer 132. Note that the dichroic layer 132 may be formed not only on the portion where the luminescent material layer 131 is formed but also on the whole surface of the luminescent wheel 71. Since the dichroic layer 132 may only have to be formed between the primary light source 72 and the luminescent material layer 131, the dichroic layer 132 may be formed on a side of the transparent base material which faces the primary light source 72.

Further, a non-reflecting coated layer, not shown, is formed through coating on the whole surface of the transparent base material which lies on the side which faces the primary light source 72.

In the luminescent wheel 71, the transparent base material can also be formed by two filter pieces which correspond to the two segment areas in such a way that the filter pieces form the luminescent material layers 131B, 131G. Thereafter, the filter pieces may be combined together into a circular shape to be bonded together or may be integrated with each other by an attachment member and the like.

In this way, the belt-like blue luminescent material layer 131B and green luminescent material layer 131G are disposed in the luminescent light emitting portions 1B, 1G, respectively, so as to be adjacent to each other in an end-to-end fashion in a circumferential direction. Thus, when the light source light rays of ultraviolet light range are shone sequentially to the blue and green luminescent material layers 131B, 131G of the luminescent wheel 71 which is rotating, a luminescent light ray of blue wavelength band and a luminescent light ray of green wavelength band are emitted sequentially in response to emission of the light source light ray from the primary light source 72.

In the luminescent wheel 71, as has been described above, the dichroic layer 132 is formed on the portion of the transparent base material where the luminescent material layer 131 is disposed, and the non-reflecting coated layer is formed on the side of the transparent base material which faces the primary light source 72. By doing so, when the light ray from the primary light source 72 is shone on to the luminescent wheel 71, the light source light ray passes through the dichroic layer 132 with almost no reflecting by the non-reflecting coated layer on to the side facing the primary light source 72 so as to be incident on the transparent base material. The light source light ray that has passed through the transparent base material passes through the dichroic layer and is shone on to the luminescent material layer 131.

Luminescent materials in the luminescent material layers 131B, 131G absorb the light source light ray of ultraviolet light range as excitation light and emit luminescent light rays of blue and green wavelength bands in every direction, respectively. In these luminescent light rays so emitted, luminescent light rays which are emitted towards an opposite side to the side facing the primary light source 72 enter a light guiding unit 75 via a light guiding optical system, which will be described later. Luminescent light rays which are emitted towards the transparent base material are reflected by the dichroic layer 132, and many of the luminescent light rays so reflected enter the light guiding unit 75 via the light guiding optical system as light rays emitted from the luminescent wheel 71.

Figure 5:
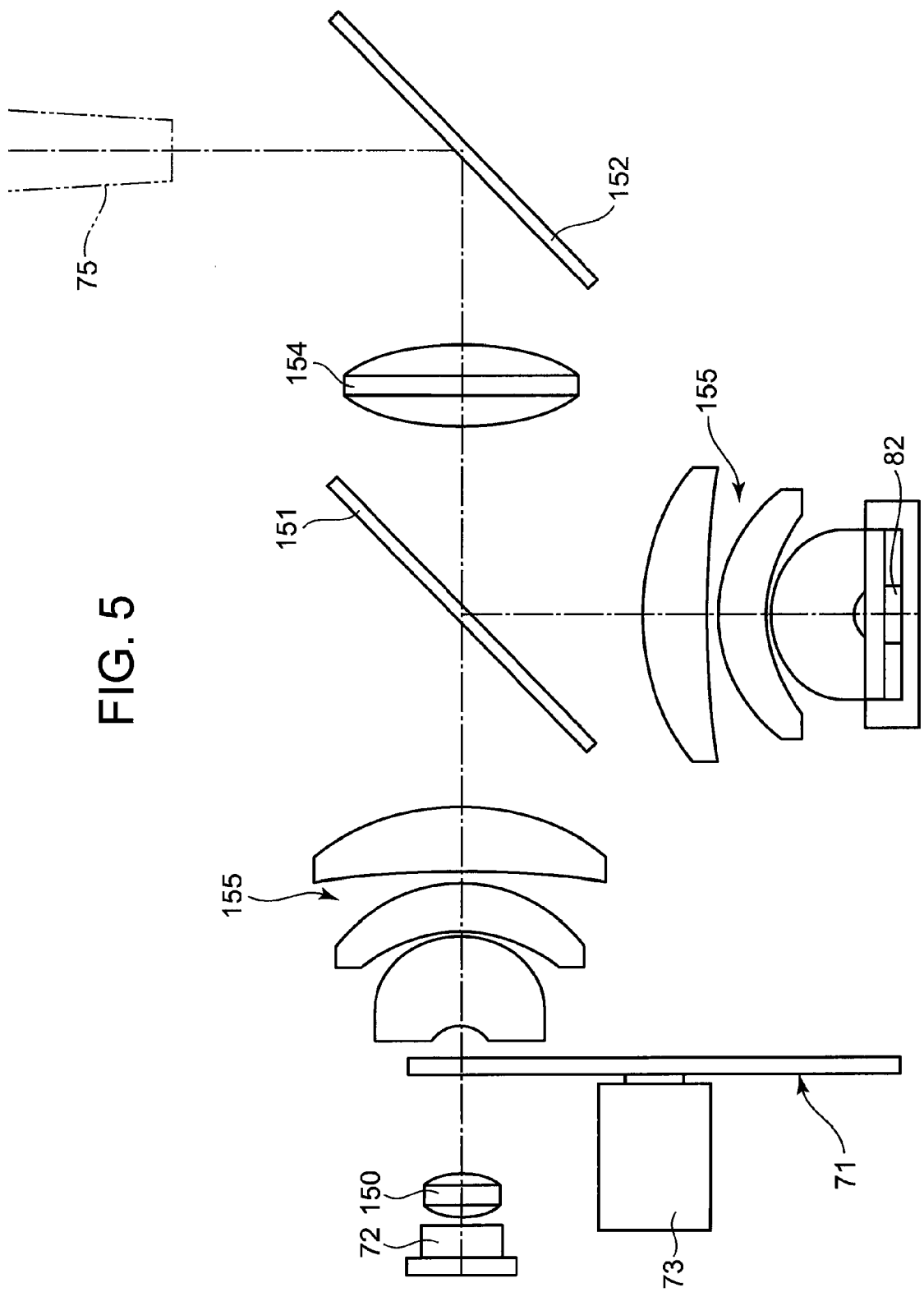
FIG. 5 is an exemplary plan view of the light source unit according to the embodiment of the invention.

Next, referring to FIG. 5, an arrangement of the light guiding optical system which includes a dichroic mirror 151, a reflecting mirror 152 and lenses, the primary light source 72 and the secondary light source 82, and the luminescent wheel 71 will be described. The light guiding optical system is an optical system which reflects or transmits the blue luminescent light ray and the green luminescent light ray which are emitted from the luminescent wheel 71 and the red light source light ray which is emitted from the secondary light source 82 so that optical axes of the light rays of the respective colors are bent or altered so as to coincide with each other to thereby be guided on the same optical path.

The primary light source 72 is disposed so that an optical axis of the primary light source 72 intersects an optical axis of the light guiding unit 75 substantially at right angles. The secondary light source 82 is disposed so that an optical axis of the secondary light source 82 becomes substantially parallel to the optical axis of the light guiding unit 75. The luminescent wheel 71 is disposed so that the optical axis of the primary light source 72 intersects a wheel surface of the wheel 71 at right angles. Namely, the rotating shaft of the wheel motor 73, which rotates the luminescent wheel 71, is parallel to the optical axis of the primary light source 72. In addition, a collimator lens 150 is disposed in direct proximity to the emanating side of the primary light source 72, which converts the light ray from the primary light source 72 into a parallel light ray.

The dichroic mirror 151 is disposed in a position where the optical axis of the primary light source 72 and the optical axis of the secondary light source 82 intersect each other. The dichroic mirror 151 transmits the blue luminescent light ray and the green luminescent light ray which are emitted from the luminescent wheel 71 and reflects the red light source light ray which is emitted from the secondary light source 85 at an angle of 90 degrees. This dichroic mirror 151 is disposed on the emanating side of the luminescent wheel 71 from which the luminescent light rays emanate so as to prevent the light ray from the secondary light source 82 from being shone on to the luminescent wheel 71.

Further, in the light guiding optical system, the reflecting mirror 152 is disposed in a position where the optical axis of the primary light source and the optical axis of the light guiding unit 75 intersect each other. The reflecting mirror 152 reflects the blue luminescent light ray and the green luminescent light ray from the luminescent wheel 71 and the red light source light ray reflected by the dichroic mirror 151 so that their directions are altered at the angle of 90 degrees.

In addition, a collective lens group 155 is disposed in proximity to an emanating surface of the luminescent wheel 71, whereby light rays which are emitted from the luminescent wheel 71 are collected so as to be shone on to the dichroic mirror 151. Similarly, another collective lens group 155 is disposed in proximity to an emanating surface of the secondary light source 82, whereby light rays which are emitted from the secondary light source 82 are collected so as to be shone on to the dichroic mirror 151. Further, a light guiding unit incident lens 154 is disposed between the dichroic mirror 151 and the reflecting mirror 152, whereby the light rays of respective colors are incident on the light guiding unit 75 such as a glass rod called a light tunnel or a light smoothing or guiding rod as the light rays which are collected further.

By configuring the light guiding optical system in the way described above, as will be described later, when the luminescent wheel 71 is caused to rotate and the primary light source 72 and the secondary light source 82 are caused to emit light rays at different timings, light rays of red, green and blue and white wavelength bands sequentially enter the light guiding unit 75 via the light guiding optical system. The DMD, which is the display device 51 of the projector 10, displays the light rays of respective colors in a time-sharing fashion, thereby making it possible to generate a color image on the screen.

Next, the control of the primary light source 72 and the secondary light source 82 by the light source control means will be described. The light source control means controls individually turning on and off operations of the primary light source 72 and the secondary light 82 source in a time-sharing fashion. This light source control means controls to turn on the secondary light source 82 when the light primary light source 72 is turned on to shine its light that an illumination area extends between the two segment areas at one of boundaries of the two segment areas, that is, a period of time is included when the illumination area passes through the boundary between the two segment areas. Namely, by the light source control means turning on the secondary fight source 82 so that the period of time is included when the light ray from the primary light source 72 is shone on to the one boundary between the adjacent segment areas of the luminescent wheel 71, a light ray of white wavelength band can be emitted from the light source unit 63 into which the light rays of blue and green wavelength bands which are emitted from the luminescent wheel 71 and the light ray of red wavelength band which is emitted from the secondary light source 82 are synthesized.

In addition, the light source control means controls to turn on the secondary light source 82 when the primary light source 72 is turned off so as to prevent the emission of a synthesized light ray synthesized from the light rays of two different (blue and green) wavelength bands from the luminescent wheel 71 by the light ray from the primary light source 72 being shone so that the illumination area extends between the two segment areas at the other boundary between the two segment areas. Namely, by turning on the secondary light source 82 when the primary light source 72 is turned off so that a non-illumination area passes through the boundary between the two segment areas, the light source unit 63 can emit only the light ray of red wavelength band from secondary light source 82.

Figure 6:
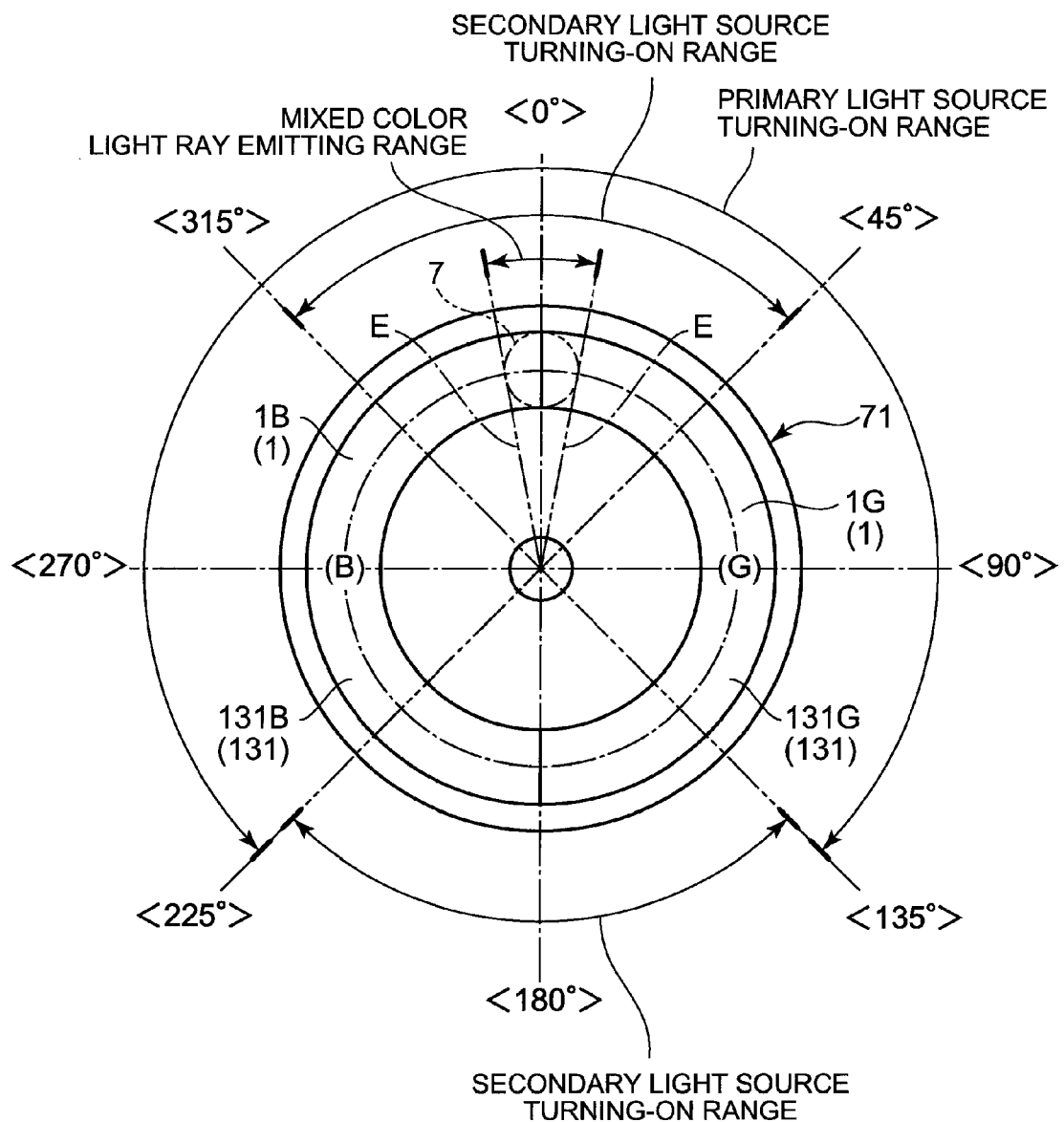
FIG. 6 is an exemplary front view of the luminescent wheel as a light emitting member which shows turning-on ranges of primary and secondary light sources according to the embodiment of the invention.
Figure 7:
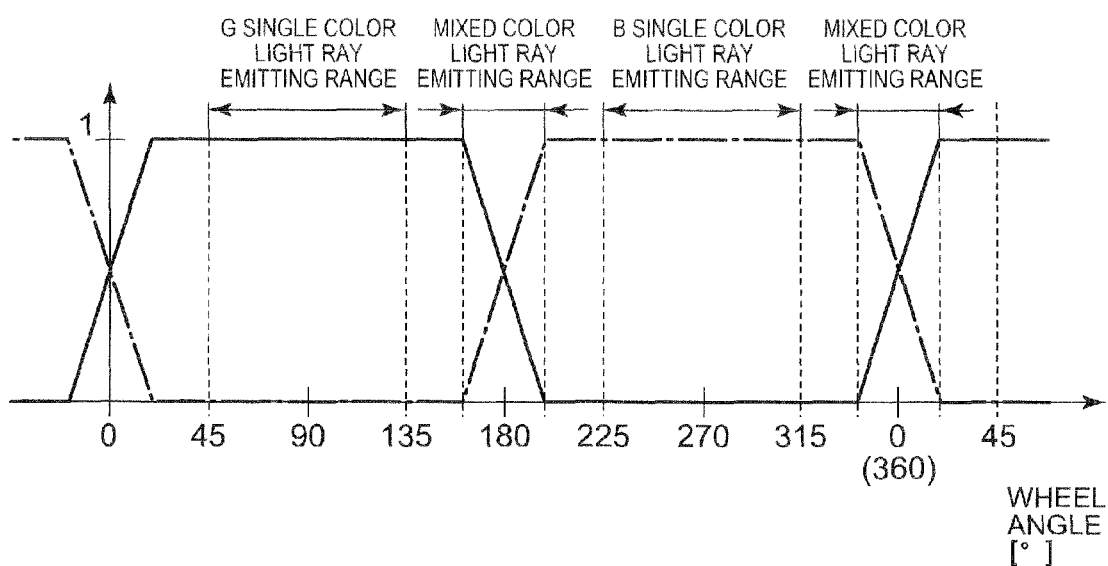
FIG. 7 is an exemplary drawing showing light quantity ratio of luminescent light rays of respective colors which are emitted from the luminescent wheel as a light emitting member when the primary light source is turned on at all times.
Figure 9A:
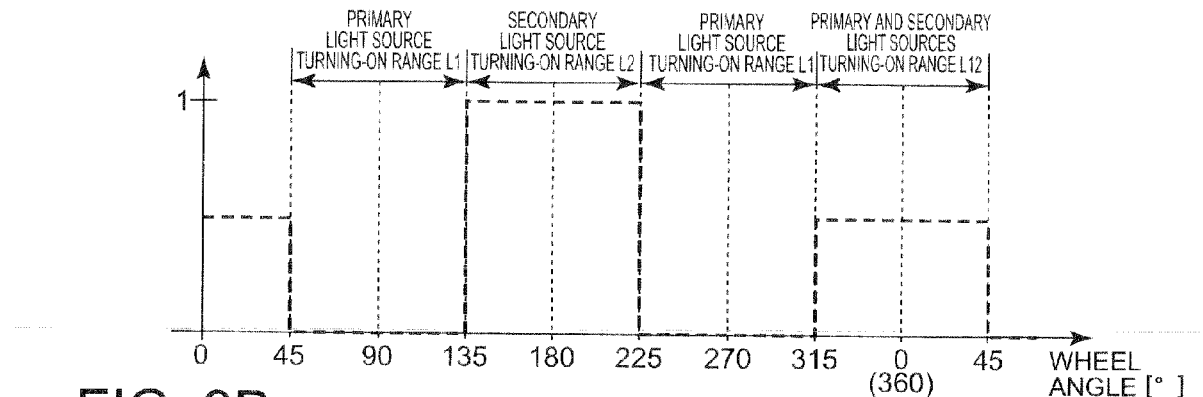
FIG. 9 shows exemplary drawings showing light quantity ratios of light rays of respective colors which are emitted from the luminescent wheel as a light emitting member according to the embodiment of the invention.
Figure 9B:
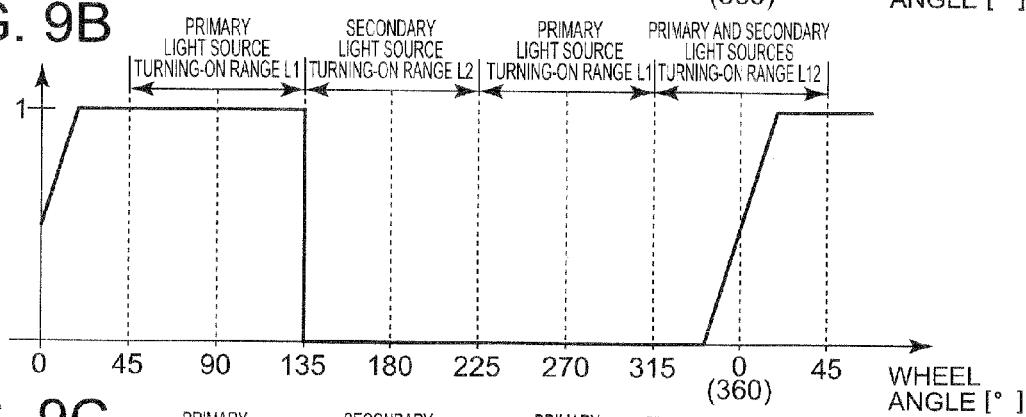
Figure 9C:
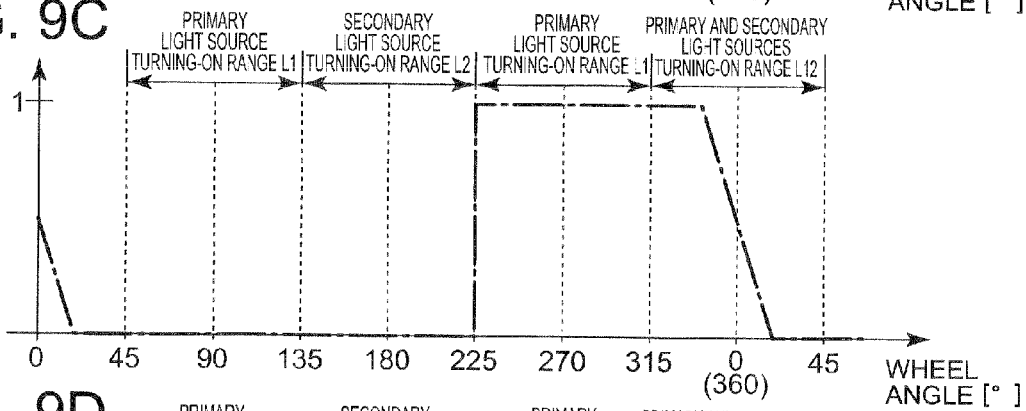
Figure 9D:
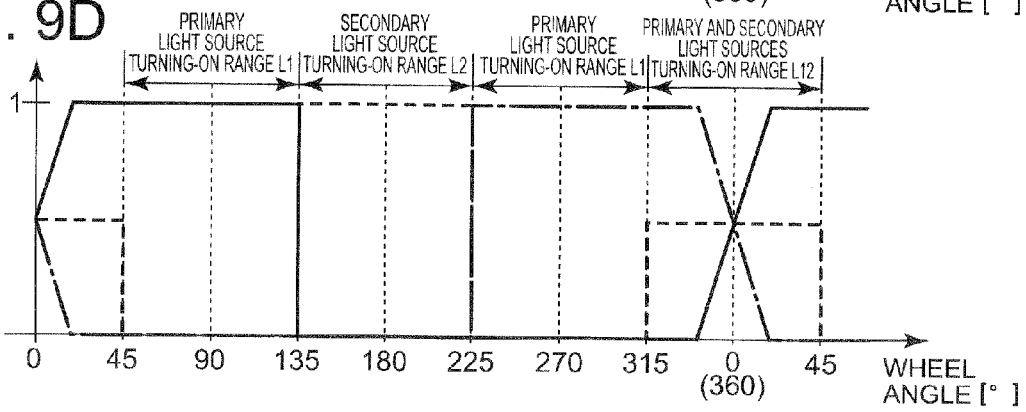

Referring to FIGS. 6 to 10, usefulness in controlling the light sources in the way described above will be described below. FIG. 6 is an exemplary front view of the luminescent wheel 71 showing turning-on ranges of the primary light source 72 and the secondary light source 82 according to the embodiment or the invention. FIG. 7 is an exemplary drawing showing a light quantity ratio of luminescent light rays of respective colors which are emitted from the luminescent wheel 71 when the primary light source 72 is turned on at all times. FIG. 8 is a time chart showing timings at which the primary light source 72 and the secondary light source 82 are turned on and off by the light source control means. FIGS. 9 and 10 are exemplary drawings showing light quantity ratios of luminescent light rays of respective colors which are emitted from the luminescent wheel 71 according to the embodiment of the invention. Note that FIGS. 7, 9 and 10 show the light quantity ratios during rated operations (that is, represented by non-dimensional numbers with light quantity ratios during rated operations referred to as 1), and transitions of light quantity ratios of light rays of green, blue and red wavelength bands are represented by a solid line, an alternate long and short dash line, and a broken line, respectively.

As is shown in FIG. 6, the luminescent wheel 71 is such that the blue luminescent light emitting portion 1B and the green luminescent light emitting portion 1G are disposed so as to be adjacent to each other in an end-to-end fashion. Consequently, should the luminescent wheel 71 be rotated with the primary light source 72 kept turned on, the illumination area 7 of the primary light source 72 extends between the blue luminescent material layer 131B and the green luminescent material layer 131G, and therefore, a light ray of mixed colors is generated at the boundaries between the blue and green luminescent light emitting portions 1B and 1G.

A mixed color light ray emitting range on the luminescent wheel 71 where the mixed color light ray is generated is a range which is defined by tangents E to the illumination area 7 illuminated by light rays of the primary light source when a center of the illumination area 7 is positioned at the boundary between the blue luminescent light emitting portion 1B and the green luminescent light emitting portion 1G, as is shown in FIG. 6. These tangents E are imaginary lines which represent a predetermined position of the luminescent wheel 71. This mixed color light emitting range is a fan-shaped and segmental area in which a center angle about a boundary line between the blue luminescent light emitting portion 1B and the green luminescent light emitting portion 1G forms an acute angle.

Namely, with the primary of light source 72 kept turned on, when the luminescent wheel 71 rotates, the tangents E (the imaginary lines) move. Then, when one of the tangents E on the luminescent wheel 71 comes to be positioned at the center of the illumination area 7 of the primary light source 72 which is fixed, that is, from a point in time when the boundary line between the green luminescent material layer 131G and the blue luminescent material layer 131B comes to an edge of the illumination area 7, a mixed color light is produced. Then, when the other tangent E on the luminescent wheel 71 comes to be positioned at the center of the illumination area 7 as a result of the luminescent wheel 71 rotating further, that is, when the boundary line between the green and blue luminescent material layers 131G, 131B comes to be positioned at the other edge of the illumination area 7, the mixed color light is switched to a single color light ray.

Consequently, in the event that the luminescent wheel 71 is rotated with the primary light source 71 kept turned on at all times, as is shown in FIG. 7, a synthesized light ray which is synthesized from the light ray of blue wavelength band and the light ray of green wavelength band is emitted from the luminescent wheel 71 within the mixed color light emitting range. Then, in this mixed color light emitting range, the synthesized light ray is emitted from the luminescent wheel 71 as a light ray of a wavelength band of cyan, which constitutes a complementary color, so as to be used in enhancing the luminance of the screen. However, in that case only approximately one-half of the usable light quantity of the normal light ray of cyan wavelength band can be obtained. The reason for this is, as shown in FIG. 7, that mean values of light quantities of the light rays of blue and green wavelength bands are individually reduced to one-half of light quantities resulting during rated operations.

Then, the light source control means is caused to execute a control in which, for example, a red light ray is emitted by turning off the primary light source 72 so as to keep only the secondary light source 82 turned on in one of one-fourth ranges which include the mixed color light ray emitting range, while in the other one-fourth range both the primary light source 72 and the secondary light source 82 are turned on so as to generate a white light ray. In addition, the light source control means is caused to execute a control in which only the primary light source 72 is turned on in other one-fourth ranges which do not include the mixed color light ray emitting range so as to emit a green light ray and a blue light ray. By dong this, the light rays of green, red, blue and white wavelength bands can sequentially be emitted from the light source unit 63.

Note that the area of the light ray of white wavelength band is one-fourth or smaller of the whole circumference of the luminescent wheel 71, and the other areas are one-fourth or larger of the whole circumference. However, as a matter of convenience, the light rays of green, red, blue and white wavelength bands will be described as being equally divided into four areas of which each area constitutes one-fourth of the full circumference.

Specifically, as is shown in FIGS. 6 and 8, a one-fourth range ranging from a wheel angle of 45 degrees to a wheel angle of 135 degrees is set as a primary light source turning-on range L1 in which only the primary light source 72 is turned on, and a one-fourth range ranging from a wheel angle of 135 degrees to a wheel angle of 225 degrees is set as a secondary light source turning-on range L2 in which only the secondary light source 82 is turned on. Additionally, a one-fourth range ranging from a wheel angle of 225 degrees to a wheel angle of 315 degrees is set as a primary light source turning-on range L1 in which only the primary light source 72 is turned on, and a one-fourth range ranging from a wheel angle of 315 degrees to the wheel angle of 45 degrees is set as a primary and secondary light sources turning-on range L12 in which the primary light source 72 and the secondary light source 82 are turned on.

Here, the wheel angles in the figure represent in degrees a position on the wheel surface (specifically, a position on the wheel surface which is disposed at the center of the illumination area 7) based on one of boundary line positions between the green luminescent light ray emitting portion 1G and the blue luminescent light ray emitting portion 1B which functions as a reference (0 degree). This position moves as the luminescent wheel 71 rotates.

Consequently, when the wheel position ranging from the wheel angle of 45 degrees to the wheel angle of 135 degrees is positioned at the center of the illumination area 7, only the primary light source 72 is turned on. Thus, a light ray emitted from the primary light source 72 is shone on to the green luminescent material layer 131G of the green luminescent light emitting portion 1G of the luminescent wheel 71, whereby a green luminescent light ray (G) emitted from the luminescent wheel 71 is emitted from the light source unit 63 so as to enter the light guiding unit 75.

In addition, when the wheel position at the wheel angle of 135 degrees which lies just before the boundary between the green luminescent light ray emitting portion 1G and the blue luminescent light ray emitting portion 1B is positioned at the center of the illumination area 7 of the primary light source 72, the primary light source 72 is turned off and the secondary light source 82 is turned on. As this occurs, only a red light source light ray (R) from the secondary light source 82 is emitted from the light source unit 63 so as to enter the light guiding unit 75.

When the luminescent wheel 71 rotates, causing the wheel position at the wheel angle of 225 degrees to be positioned at the center of the illumination area 7, the light source control means executes a control to turn on the primary light source 72 and to turn off the secondary light source 82, whereby the light ray from the primary light source 72 is shone on to the blue luminescent material layer 131B of the blue luminescent light ray emitting portion 1B of the luminescent wheel 71. As this occurs, a blue luminescent light ray (B) which is emitted from the luminescent wheel 71 is emitted from the light source unit 63 so as to enter the light guiding unit 75.

In the event that the light source control means executes a control to turn on both the primary light source 72 and the secondary light source 82 when the center of the illumination area 7 of the primary light source 72 is positioned within the wheel angle ranging from the wheel angle of 315 degrees to the wheel angle of 45 degrees, green and blue luminescent light rays emitted from the luminescent wheel 71 and a red light source light ray emitted from the secondary light source 82 are synthesized into a white light ray (W), which is emitted from the light source unit 63. Consequently, the light rays of green (G), red (R), blue (B) and white (W) wavelength bands are sequentially emitted from the light source unit 63. Thus, the projector 10 displays the light rays of respective colors which are allowed to enter in accordance with data at the display device 51 in a time-sharing fashion, thereby making it possible to generate a color image on the screen.

Although not shown, the light source control means controls timings at which the primary light source 72 and the secondary light source 82 are turned on and off so that slightly before either of the primary light source 72 and the secondary light source 82 is turned off the other light source is turned on when the wheel positions at the wheel angles of 135 degrees and 225 degrees are positioned at the center of the illumination area 7 in order to prevent a reduction in luminance which results from a state in which neither the primary light source 72 nor the secondary light source 82 becomes luminous.

When the red light ray which is emitted without changing the current value or load of the secondary light source 82 is synthesized with the green and blue light rays in the primary and secondary light sources turning-on range L12 (which ranges from the wheel angle of 315 degrees to the wheel angle of 45 degrees), the light quantities of green and blue light rays in the light source turning-on range ranging from the wheel angle of 315 degrees to the wheel angle of 45 degrees become as mean values one-half of the light quantity of the green light ray (G) or the blue light ray (B) in the single color light ray emitting range as shown in FIG. 7. Thus, a resulting light ray becomes a reddish white light ray. Consequently, the control current value, load and light emitting time of the secondary light source 82 are preferably adjusted so that the light quantity of the secondary light source 82 is reduced to one-half thereof.

Referring to FIGS. 9 and 10, a control will be described to increase or decrease the output of the primary light source 72 or the secondary light source 82 so as to generate a white light ray in which average light quantities of the light rays of respective colors are made substantially equal. Light quantity ratios of the light rays of red, green and blue wavelength bands are shown in FIGS. 9A and 10A to FIGS. 9C and 10D, respectively, and light quantity ratios into which those light quantities are combined are shown in FIGS. 9D and 10D. For example, in the event that the load of the secondary light source 82 is decreased so that the light quantity of the red light ray in the primary and secondary light sources turning-on range L12 becomes one-half of the light quantity thereof in the secondary light source turning-on range L2 as is shown in FIG. 9A, a white light ray in which the mean light quantities of the light rays of respective colors in the primary and secondary light sources tuning-on range L12 are made equal as is shown in FIG. 9D can be generated without changing the light quantity ratios of the light rays of green and blue wavelength bands as is shown in FIGS. 9B and 9C.

In this way, by executing the lighting control to turn on the primary light source 72 and the secondary light source 82 by the light source control means in association with the rotation of the luminescent wheel 71, the light rays of green (G), red (R), blue (B) and white (W) can sequentially be emitted so as to enter the light guiding unit 75. In addition, the enhancement in luminance can be realized by emitting the light ray of white.

Figure 10A:
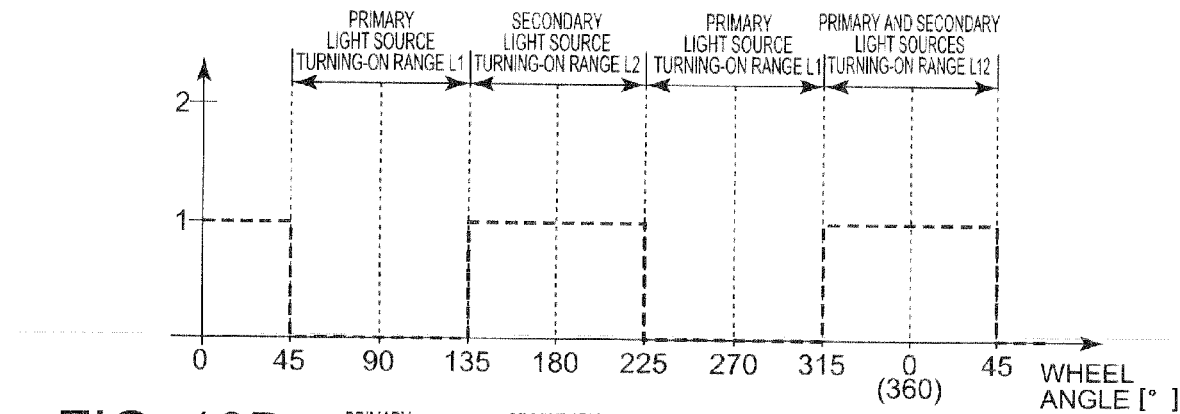
FIG. 10 shows exemplary drawings showing light quantity ratios of light rays of respective colors which are emitted from the luminescent wheel as a light emitting member according to the embodiment of the invention.
Figure 10B:
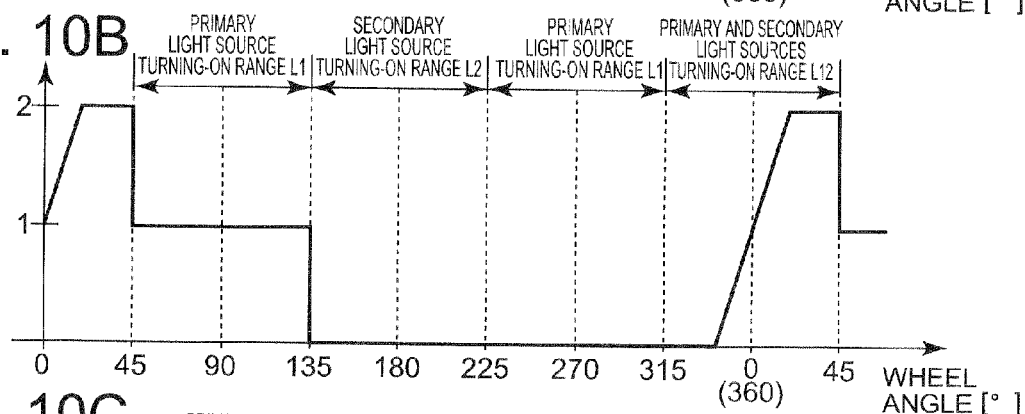
Figure 10C:
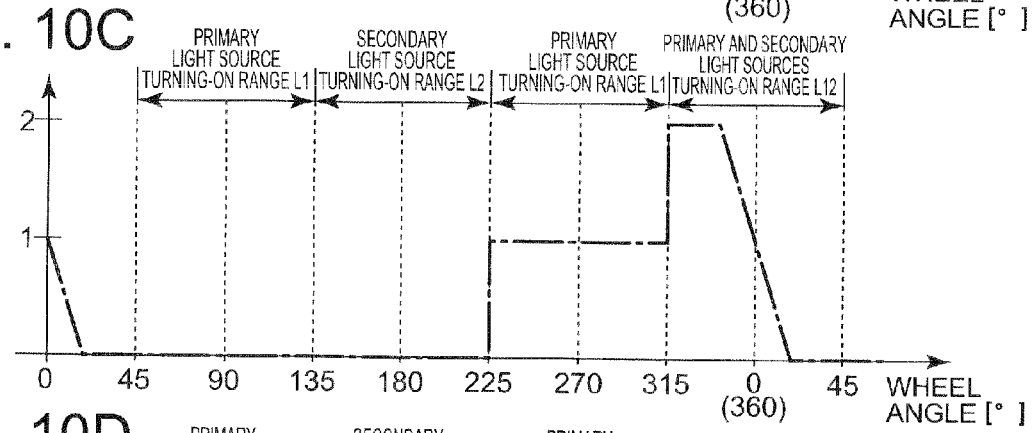
Figure 10D:
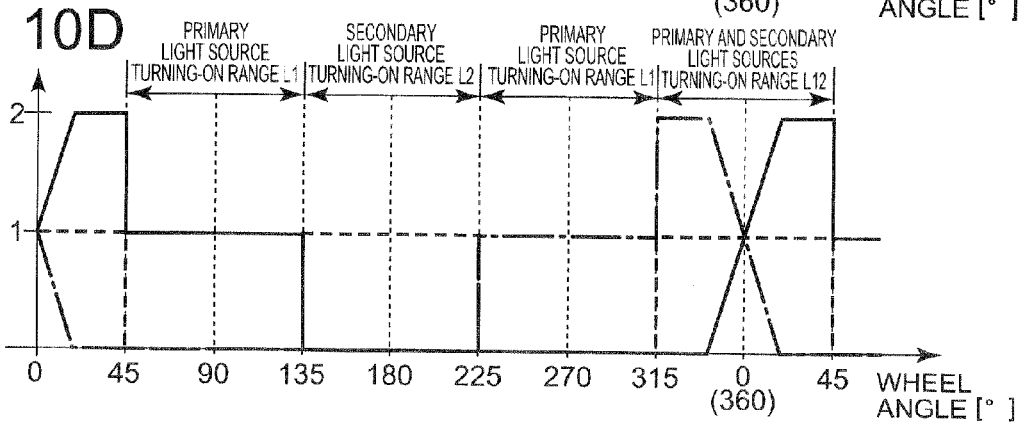

In addition, instead, by increasing the load of the primary light source 72 without decreasing the load of the secondary light source 82, the mean light quantities of the light rays of respective colors can also be adjusted so as to become equal to each other. In this case, as is shown in FIGS. 10B and 10C, in the event that the primary light source 72 is operated under its rated load in the primary light source turning-on range L1, while in the primary and secondary light sources turning-on range L12, the primary light source 72 is operated under a load which is about twice the rated load, a bright white light ray can be generated as is shown in FIG. 10D without decreasing the light quantity ratio of the red light ray as is shown in FIG. 10A, thereby making it possible to realize a further increase in luminance.

Although the output of the primary light source 72 is increased so that the primary light source 72 is overloaded (to the rated load value or larger) momentarily in one one-fourth range, since there exists a primary light source turning-off range in another one-fourth range (the secondary light source turning-on range L2), the loaded mean can maintain its rated value.

In this way, according to the invention, due to the light source unit 63 including the primary light source 72 which excites the luminescent materials, the luminescent wheel 71 having the types of luminescent materials with good luminous efficiencies, and the secondary light source 82 which is the single-color light source which emits the light ray of red wavelength band which corresponds to a luminescent material with low luminous efficiency without forming, for example, a red luminescent material on the luminescent wheel 71 as the luminescent material with low luminous efficiency, there can be provided the light source unit 63 which can enhance the luminance of the screen and the projector 10 which includes the light source unit 63.

In addition, since the light ray of white wavelength band can be generated by causing the light ray from the primary light source 72 to be shone on to the boundary between the luminescent light emitting portions 1B and 1G of the luminescent wheel 71 so that the illumination area extends between the boundary between the luminescent light emitting portions 1B and 1G, turning on the secondary light source 82 as well when the light ray from the primary light source 72 is shone on to the luminescent wheel 71 so that the period of time is included when the illumination area passes through the boundary, and synthesizing the light ray of green wavelength band and the light ray of blue wavelength band which are emitted from the primary light source and the light ray of red wavelength band which as emitted from the secondary light source 82, there can be provided the light source unit 63 which can enhance the luminance of the screen further and the projector 10 which includes the light source unit 63.

The types of the light sources and the configuration of the luminescent wheel 71 which are used in the light source unit 63 are not limited to the mode described above. For example, a light emitting diode may be used for the primary light source 72, while a laser emitter may be adopted for the secondary light source 82. Note that by adopting a laser emitter for the primary light source 72 as the excitation light source, high-output excitation light can be emitted so as to excite the luminescent materials with good efficiency, while by adopting a light emitting diode for the secondary light source 82, the product costs can be suppressed.

The primary light source 72 is not limited to the case in which it is made up of the light source which emits the light ray of ultraviolet light range. Instead, a light emitting diode a laser emitter which emit a light ray of blue wavelength band can also be adopted for the primary light source. Hereinafter, a modified example will be described in which a blue laser emitter is adopted for the primary light source 72.

Figure 11A:
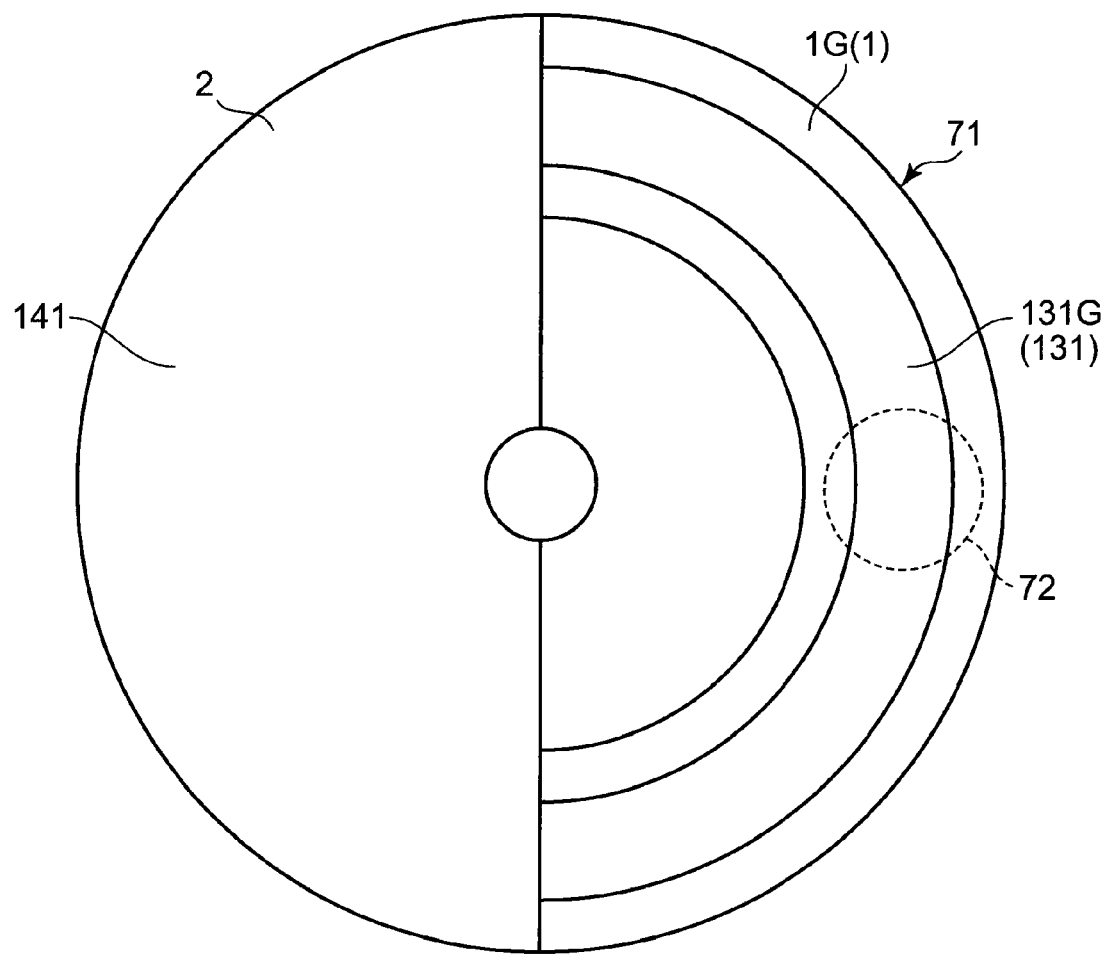
FIG. 11A is an exemplary front view of another form of luminescent wheel as a light emitting member of the light source unit according to the embodiment of the invention.
Figure 11B:
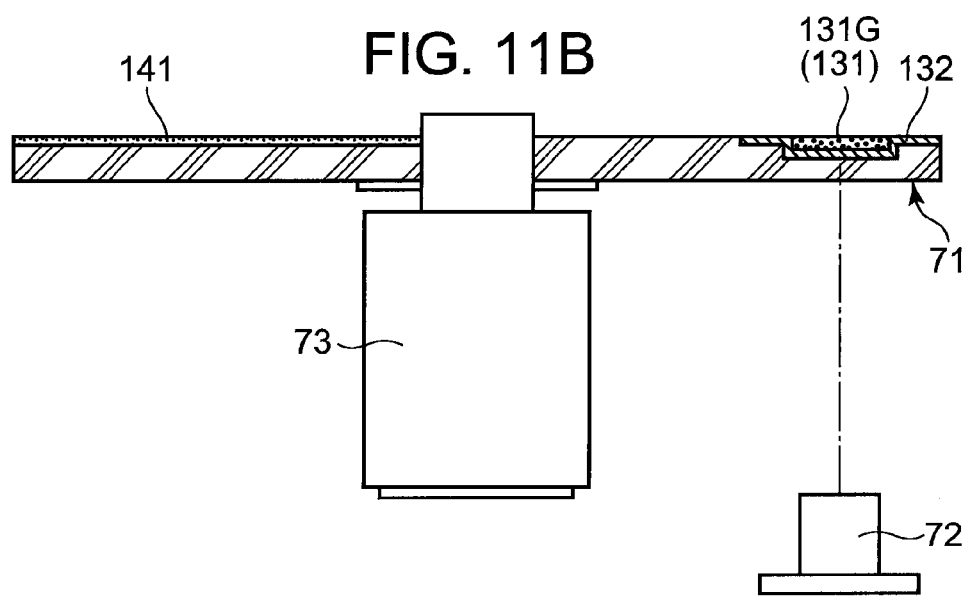
FIG. 11B is an exemplary partially sectional plan view of the luminescent wheel.

In a case that a laser emitter which emits a laser beam of blue wavelength band is adopted for the primary light source 72, as is shown in FIG. 11 in the luminescent wheel 71, a transmissive portion 2 is formed on the segment area where the blue luminescent light emitting portion 1B (refer to FIG. 4) is formed in place thereof, the transmissive portion 2 being adapted to transmit the blue excitation light without absorbing it.

This transmissive portion 2 is made up of a semicircular diffuse plate which transmits the light ray of blue wavelength band from the primary light source 72 and which has a diffuse layer 141 on an opposite side to a side which faces the primary light source 72. Specifically, this diffuse layer 141 is formed as a layer which imparts a diffuse effect to a blue light source light ray when the diffuse layer 141 transmits the light ray by applying an optical treatment such as a roughening treatment by blasting to a transparent base material of the semicircular plate.

In addition to applying the optical treatment to the surface of the transparent base material, the diffuse layer 141 may be formed by securing belt-shaped solid substances which are optical substances to the surface of the transparent base material. The diffuse layer 141 may be formed on the side which faces the primary light source 72 without forming it on the opposite side to the side facing the primary light source 72.

Consequently, when a laser beam of blue wavelength band is shone onto the diffuse layer 141 from the primary light source 72, since the diffuse layer 141 imparts the diffuse effect to the blue light source light ray that has entered the diffuse layer 141, a blue light ray is emitted from the diffuse layer 141, and this blue light ray is which is a diffuse light ray similar to the emitted light ray (the green luminescent light ray) that is emitted from the green luminescent material layer 131G. The blue light ray so emitted then enters the light guiding unit 75 via the light guiding optical system.

In this way, even with the configuration in which the luminescent wheel 71 is formed by the green luminescent light emitting portion 1G having the green luminescent material layer 131G and the transmissive portion 2 having the diffuse layer 141 and the excitation light is emitted from the primary light source 72 as the light ray of blue wavelength band, a similar advantage to that described above can also be provided in the event that the light source control means executes a similar light source control to that described above. In addition, since the blue light ray from the primary light source 72 can be used as an emitted light ray from the light source unit 63 as it is, the production cost can be controlled by suppressing the use of relatively expensive luminescent materials.

Figure 12A:
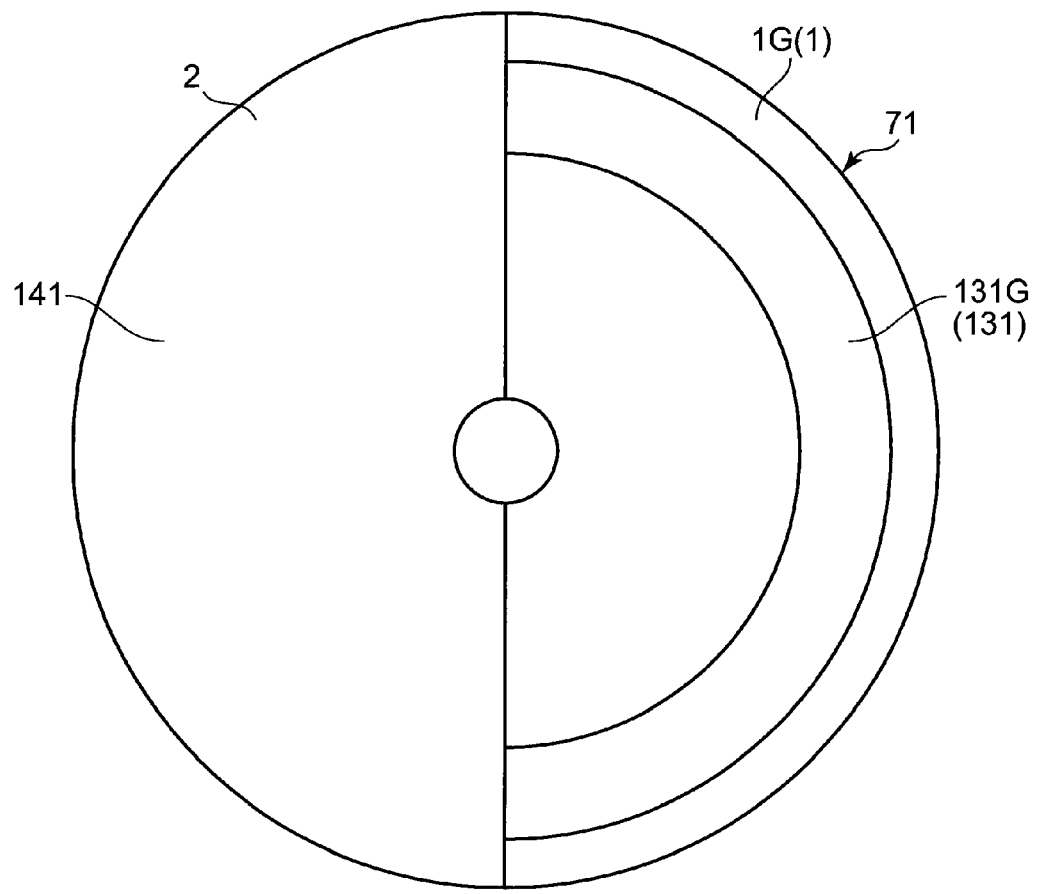
FIG. 12A is an exemplary front view of a luminescent wheel as a light emitting member according to a modified example of the invention and FIG. 12B is an exemplary partially sectional plan view of the luminescent wheel.
Figure 12B:
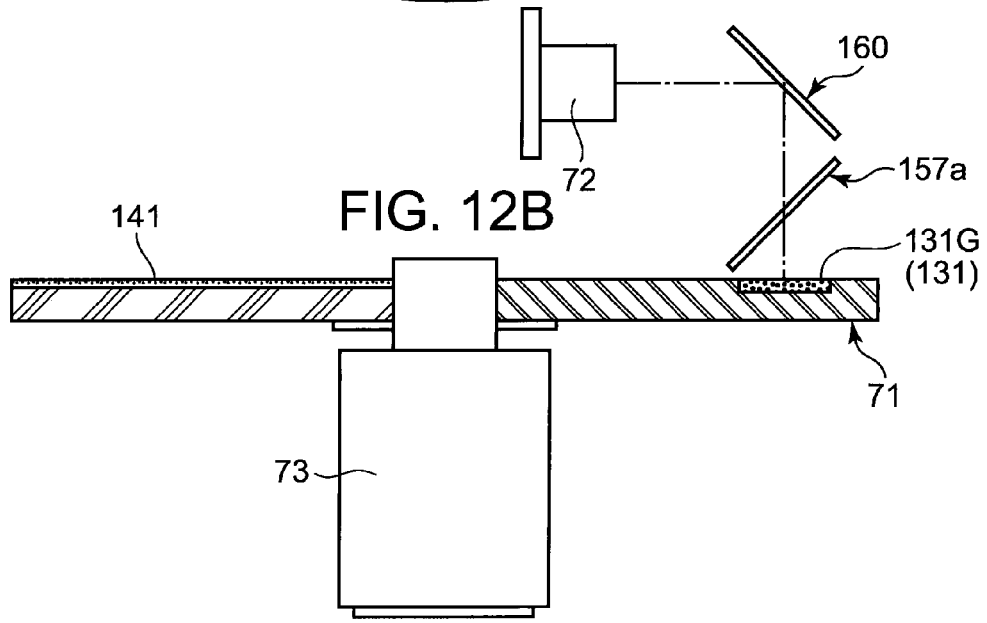

The base material of the luminescent light emitting portion 1 of the luminescent wheel 71 is not limited to the transparent base material, and hence, a metallic base material can also be used. Hereinafter, a luminescent wheel 71 utilizing a metallic base material will be described by reference to FIG. 12. A metallic base material is adopted for this luminescent wheel 71 in place of the transparent base material of the luminescent light emitting portion 1.

A reflecting surface which reflects light is formed on a surface of a side of the metallic base material which faces the primary light source 72. Namely, this base material is a semicircular reflecting plate to which a mirror treatment is applied, and the other semicircular portion is made of a transparent base material and a diffuse layer 141 is formed thereon. In addition, the primary light source 72 is disposed on a side where a luminescent material layer 131 is formed.

Consequently, in the event that a luminescent material in the luminescent material layer 131 absorbs a blue light source light ray as excitation light and emits luminescent light rays of green wavelength band in every azimuth, a luminescent light ray which is emitted towards the primary light source 72 side enters the light guiding unit 75 via the light guiding optical system, which will be described later. In addition, a green luminescent light ray which is emitted towards the base material side is reflected by a reflecting layer (not shown), and much of the reflected light ray is configured as an emitted light ray from the luminescent wheel 71 and enters the light guiding unit 75 via the light guiding optical system.

The blue light source light ray which is shone on to the reflecting layer without being absorbed by the luminescent material n the luminescent material layer 131 is also reflected on the reflecting layer and is then emitted again to the luminescent material layer 131 side so as to enable the luminescent material to excite. Consequently, the utilization efficiency of the blue light source light ray is enhanced, thereby making it possible to enable the blue light source light ray to be luminous more brightly.

The blue light source light ray which returns from the luminescent material layer 131 to the primary light source 72 side without being absorbed by the luminescent material in the luminescent material layer 131 because of reflecting by a reflecting layer travels together with the green luminescent light ray from the luminescent material layer 131 to the primary light source 72 side. However, the blue light source light ray is separated from the green luminescent light ray by a primary optical axis altering mirror 157a which is a dichroic mirror which reflects a green light ray and transmits a blue light ray. Namely, only the green luminescent light ray of the light rays which are emitted from the luminescent wheel 71 to the primary light source 72 side is reflected by the dichroic mirror to enter the light guiding or 76 via other mirrors or lenses of the light guiding optical system.

Figure 13:
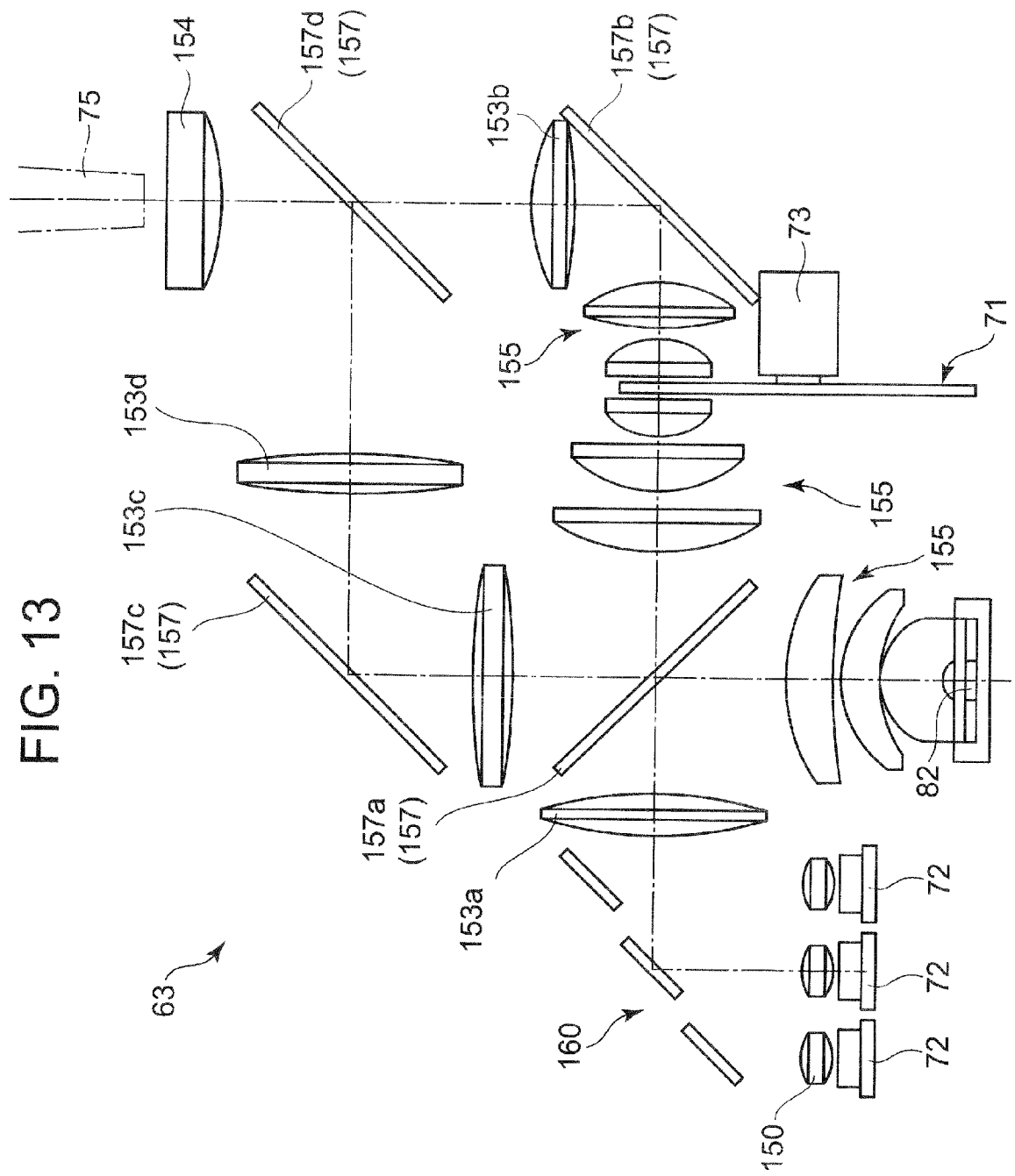
FIG. 13 is an exemplary plan view of a light source unit according to a modified example of the invention.

An example of a light guiding optical system in which a base material is configured as a reflecting plate will be described by reference to FIG. 13. This light guiding optical system includes a reflecting mirror group 160 which disposed on optical axes of primary light sources 72 so as to reflect light rays from the primary light sources 72 while bending or altering the directions of the light rays at an angle of 90 degrees. This light guiding optical system includes dichroic mirrors and reflecting mirrors which reflect or transmit light rays of predetermined wavelength bands which are emitted from a luminescent wheel 71 and a secondary light source 82 so as to collect a blue light ray and a green light ray from the luminescent wheel 71 and a red light ray from the secondary light source 82 to the same optical path and a collective lens which collects the light rays of wavelength bands of the respective colors into a pencil of light.

Specifically, this light guiding optical system has a primary optical axis altering mirror 157a which is a dichroic mirror which is disposed between the primary light sources 72 and the luminescent wheel 71 and which transmits the light rays from the primary light sources 72 and reflects the luminescent light ray from the luminescent material. This light guiding optical system also has secondary to quaternary optical axis altering mirrors 157b, 157c, 157d which are a plurality of reflecting mirrors or dichroic mirrors which can collect the light rays of the primary light sources 72 which have passed through a transmissive portion 2 on the luminescent wheel 71, the luminescent light ray which is reflected on the primary optical axis altering mirror 157a and the light ray which is emitted from the secondary light source 82 to the same optical path so as to emit them towards the same direction.

The primary optical axis altering mirror 157a is disposed between the primary light sources 72 and the luminescent wheel 71 on the optical axes of the primary light sources 72 which are altered at an angle of 90 degrees by the reflecting mirror group 160 and the optical axis of the secondary light source 82. This primary optical axis altering mirror 157a transmits the blue light source light rays which are emitted from the primary light sources 72 as excitation light and the red light source light ray which is emitted from the secondary light source 82 and reflects the luminescent light ray of green wavelength band which is emitted from a luminescent material in a luminescent material layer 131 on the luminescent wheel 71 while altering the direction of the luminescent light ray at an angle of 90 degrees.

The secondary optical axis altering mirror 157b is a normal reflecting mirror which is disposed in a position which lies on an opposite side of the luminescent wheel 71 to a side thereof which faces the primary light sources 72 on the optical axes of the primary light sources 72 which are altered by the reflecting mirror group 160 and which alters an optical axis of the blue light source light ray that has passed through a diffuse layer 141 on the transmissive portion 2 of the luminescent wheel 71 through 90 degrees. Namely, the secondary optical axis altering mirror 157b reflects the light ray of blue wavelength band which is emitted from the luminescent wheel 71 while altering the direction of the blue light ray at an angle of 90 degrees. The secondary optical axis altering mirror 157b may not be configured as the reflecting mirror but may be configured as a dichroic mirror which can reflect the light ray of blue wavelength band.

The tertiary optical axis altering mirror 157c is a reflecting mirror which is disposed on an optical axis of the green luminescent light ray whose direction is altered by the primary optical axis altering mirror 157a (that is, on the optical axis of the secondary light source 82) so as to face the primary optical axis altering mirror 157a and which alters the luminescent light ray whose direction is altered by the primary optical axis altering mirror 157a and the optical axis of the secondary light source 82 through 90 degrees. Namely, the tertiary optical axis altering mirror 157c reflects the green luminescent light ray reflected by the primary optical axis altering mirror 157a and the red light source light ray in the secondary light source 82 while altering the directions of those light rays by an angle of 90 degrees. The tertiary optical axis altering mirror 157c may not be configured as the reflecting mirror but may be configured as a dichroic mirror which can reflect a green light ray and a red light ray.

The quaternary optical axis altering mirror 157d is disposed so as to face the secondary optical axis altering mirror 157b and the tertiary optical axis altering mirror 157c. The quaternary optical axis alternating mirror 157d is disposed in a position where the optical axis of the blue light source light ray which is reflected by the secondary optical axis altering mirror 157b and the optical axes of the green luminescent light ray and the red light source light ray which are reflected by the tertiary optical axis altering mirror 157c intersect so as to transmit the blue light source light ray which is reflected by the secondary optical axis altering mirror 157b to thereby cause it to travel straight ahead and so as to reflect the light rays of red and green wavelength bands which are reflected by the tertiary optical axis altering mirror 157c while altering the directions of those light rays by an angle of 90 degrees.

By this configuration, the blue light source light ray that has passed through the quaternary optical axis altering mirror 157d and the red light source light ray and the green luminescent light ray which are reflected by the quaternary optical axis altering mirror 157d are collected to the same optical axis and all the rays or respective colors are emitted in the same direction.

In this way, by disposing the four optical as axis altering mirrors 157 in the light guiding optical system, the light source unit 63 can alter the optical axes of the blue light ray and the green light ray which are emitted in the different directions from the luminescent wheel 71 and the optical axis of the red light ray which is emitted from the secondary light source 82 so as to coincide with the optical axis of the light guiding unit 75. By doing so, since the light rays of respective colors can be collected to the same optical axis so as to be emitted towards the same direction, the light rays of respective colors which are emitted from the light source unit 63 can be caused to enter sequentially the light guiding unit 75.

In addition, this light guiding optical system also includes lenses in each of which a plurality lens elements are disposed to collect light rays together with the dichroic mirrors and mirrors, the lenses and the mirrors being disposed between the primary light sources 72 and the luminescent wheel 71 and along the optical paths of the luminescent light from the luminescent wheel 71 and the light source light rays which have passed through the luminescent wheel 71. By adopting this configuration, the light rays whose traveling directions are altered by the mirrors are collected by the lenses so as to allow them to enter the light guiding unit 75 with good efficiency.

Specifically, the blue light rays which are emitted from the plurality of primary light sources 72 are converted into parallel light rays whose directivities are increased by collimator lenses 160 and are collected by a primary convex lens 153a which is disposed between the reflecting mirror group 160 and the primary optical axis altering mirror 157a. By a collective lens group 155 being disposed in proximity to front and rear surfaces of the luminescent wheel 71, the light ray of blue wavelength band which is collected by the primary convex lens 153a is shone on to the luminescent wheel 71 in such a state that the light of blue wavelength band which is collected by the primary convex lens 153a is collected further by the collective lens group 155, and light rays which are emitted from front and rear surfaces of the luminescent wheel 71 are also collected. Similarly, by the collective lens group 155 being disposed in proximity to an emanating surface of the secondary light source 82, light rays which are emitted from the secondary light source 82 are collected so as to enter the primary optical axis altering mirror 157a.

Further, a secondary convex lens 153b is disposed between the secondary optical axis altering mirror 157b and the quaternary optical axis altering mirror 157d. A tertiary convex lens 153c is disposed between the primary optical axis altering mirror 157a and the tertiary optical axis altering mirror 157c. A quaternary convex lens 153d is disposed between the tertiary optical axis altering mirror 157c and the quaternary optical axis altering mirror 157d. Further, a light guiding unit incident lens 154 is disposed between the quaternary optical axis altering mirror 157d and the light guiding unit 75. Thus, the light rays of the luminescent wheel 71 and the secondary light source 82 are collected into a pencil of light, which is then allowed to enter the light guiding unit 75.

In addition, the blue light source light rays emitted from the primary light sources 72 via the collimator lenses 150 are collected by the primary convex lens 153a to pass through the primary optical axis altering mirror 157a and are collected further by the collective lens group 155 to be shone on to the luminescent material layer 131 or the diffuse layer 141 of the luminescent wheel 71.

In the event that the light source light rays are shone on to the diffuse layer 141 of the transmissive portion 2 of the luminescent wheel 71, the blue light source light rays pass through the diffuse layer 141 to be converted into a diffuse light ray, which is collected by the collective lens group 155 which is disposed on the opposite side of the luminescent wheel 71 to the side thereof which faces the primary light sources 72 to thereby be shone on to the secondary optical axis altering mirror 157b. In addition, the blue light source light rays are reflected by the secondary optical axis altering mirror 157b to thereby be collected by secondary convex lens 153b. Thereafter, the blue light source light rays so collected are passed through the quaternary optical axis altering mirror 157d and are collected by the light guiding unit incident lens 154 to thereby be allowed to enter the light guiding unit 75.

In the event that the blue light source light rays are shone on to the luminescent material layer 131 of the luminescent material layer 131 of the luminescent light emitting portion 1 of the luminescent wheel 71, a luminescent light ray of green wavelength band is emitted to the primary light source 72 side. The luminescent light ray is collected by the collective lens group 155 disposed on the primary light source 72 side of the luminescent wheel 71 to thereby be shone on to the primary optical axis altering mirror 157a. Here, the green light source light rays are reflected by the primary optical axis altering mirror 157a. However, the blue light source light rays which are reflected without being absorbed by the luminescent material in the luminescent material layer 131 pass through the primary optical axis altering mirror 157a. Thus, since the green luminescent light ray and the blue light source light rays are separated from each other, a reduction in color purity can be prevented.

The luminescent light ray which is reflected by the primary optical axis altering mirror 157a is collected by the tertiary convex lens 153c to thereby be shone on to the tertiary optical axis altering mirror 157c. Then, the luminescent light ray is reflected by the tertiary optical axis altering mirror 157c and is collected quaternary convex lens 153d. Thereafter, the luminescent light ray is shone on to the quaternary optical axis altering mirror 157d. Further, the luminescent light ray is reflected by the quaternary optical axis altering mirror 157d and is then collected by the light guiding unit incident lens 154 to thereby be allowed to enter the light guiding unit 75

The red light source light ray which is emitted by the secondary light source 82 and is collected by the collective lens group 155 passes through the primary optical axis altering mirror 157a. As similar with the green luminescent light ray, when being guided via the tertiary optical axis altering mirror 157c and the quaternary optical axis altering mirror 157d, the red light source light ray is collected by the tertiary convex lens 153c, the quaternary convex lens 153c and the light guiding unit incident lens 154 to thereby be allowed to enter the light guiding unit 75.

By configuring the light guiding optical system in the way described heretofore, although the light rays emitted from the luminescent wheel 71 include the green luminescent light ray and tiny amounts of the blue light source light rays which are reflected from the luminescent wheel 71, by the primary optical axis altering mirror 157a, which is configured as the dichroic mirror, being disposed between the primary light sources 72 and the luminescent wheel 71, the blue light source light rays which are reflected by the luminescent wheel 71 and are mixed with the luminescent light ray of green wavelength band can be cut off. Thus, there can be provided the light source unit 63 which can emit light rays of respective colors with high color purity in which the mixing of the light source light rays with the luminescent light ray is prevented in an ensured fashion and the projector 10 which includes the light source unit 63.

As has been described before, in the event that the luminescent wheel 71 is rotated and the optical source control unit executes the light source control to emit light rays from the primary light sources 72 and the secondary light source 82 at different timings, the light rays of green, red, blue and white wavelength bands are allowed to enter sequentially the light guiding unit 75 via the light guiding optical system, and the DMD which is the display device 51 of the projector 10 displays light rays of respective colors in accordance with data in a time-sharing fashion, whereby a bright color image can be generated on the screen.

A configuration may be adopted in which with no diffuse layer 141 provided on the transmissive portion 2 of the luminescent wheel 71, the transmissive portion 2 is formed of a normal glass plate or by a space as a through hole which is formed by forming a frame on a circumference of the space, and an optical component which imparts the diffuse effect to light rays which pass therethrough is fixedly disposed on the laser beam optical path in a position lying directly close to the luminescent wheel 71 on the primary light source 72 side or the emanating side of the luminescent wheel 71. In addition, with both the primary light sources 72 and the secondary light source 82 made up of light emitting diodes, the light source unit 63 may adopt a configuration in which the diffuse layer 141 is not provided on the transmissive portion 2 or the optical path.

In this way, also by forming the base material which forms the luminescent material layer by the metallic base material having the reflecting surface, there can be provided the light source unit 63 which can enhance the luminance of the screen and the projector 10 which includes this light source unit 63. In addition, by adopting a metallic base material having high thermal conductivity, the luminescent wheel 71, which is configured as the light emitting member, can be cooled with good efficiency.

The invention is not limited to the embodiment that has been described heretofore and hence can be modified or improved freely without departing from the spirit and scope thereof. For example, the light source control means does not have to be provided in the projector 10 and may be provided individually for the light source unit 63. The arrangement of the optical components is not limited to the configurations (refer to FIGS. 5 and 13) that have been described above but a variety of arrangements can be adopted.

Since the light source unit 62 can adopt the various optical arrangements in the way described above, not only can the luminance of the screen be enhanced, but also the degree of freedom in installing the light source unit 63 in equipment such as the printer 10 can be enhanced.

In the embodiment described above, while the dichroic mirrors are used for altering the directions of the optical axes and selecting the transmission or reflection of the light rays in accordance with the wavelengths thereof, the invention is not limited thereto. For example, the aforesaid dichroic mirrors may be replaced by other alternative devices such as dichroic prisms.

Further, the segment areas which are formed on the base material of the luminescent wheel 71 which is configured as the light emitting member are not limited to the example in which they are divided equally. There may be a case in which segment areas are divided unequally or are divided into three or more areas.

The turning-on times of the primary light source 72 and the secondary light source 82 by the light source control means are not limited to the embodiment. Hence, the turning-on times of the primary light source 72 and the secondary light source 82 can be changed freely so as to change the emitting times of the light rays of respective colors, thereby making possible to execute various modes with respect to brightness.

The light source control means can control the turning-on times of the primary light source 72 and the secondary light source 82 so that the emitting times of the light rays of respective colors get short so as to adjust the luminance of the screen freely. In addition, a configuration can be adopted in which the light source control means controls the primary light source 72 or the secondary light source 82 so as to suppress the output of the light source only when the light ray of the predetermined wavelength band is emitted, thereby making it possible to adjust the tint of the color image formed.

There may be a case in which the luminescent wheel 71 is formed as a rectangular light emitting member in place of being formed into the circular disk shape, and fixed and arranged. As this occurs, an adjusting unit for altering the shining direction of a light ray from the primary light source 72 is disposed between the primary light source 72 and the light emitting member. Alternatively, a light source driving unit for driving the primary light source 72 so as to alter the position and/or the shining direction of the primary light source 72 is provided so as to position sequentially a shining spot of the light ray from the primary light source 72 on to the respective segment areas, whereby the light rays of respective colors are allowed to enter the light guiding unit 75 via the light guiding optical system. As the adjusting unit, an optical deflector can be adopted which utilizes for example, a KTN crystal, an acoustic optical device, an MEMS mirror or the like.

In addition, the invention is not limited to the embodiment and its modified examples and hence can be modified variously in stages where the invention is carried out without departing from the spirit and scope thereof. The functions that are executed in the embodiment may be combined in as many ways as possible in carrying out the invention. The embodiment described above involves the various stages, and various inventions can be extracted through appropriate combinations of the plurality of requirements disclosed in the embodiment. For example, although advantages can be obtained even in the event that some constituent requirements are deleted from the whole constituent requirements illustrated in the embodiment, the configuration with part of the constituent requirements so deleted can be extracted as an invention.

What is claimed is:

1. A light source unit comprising:
   a primary light source which emits a light ray of a predetermined wavelength band;
   a light emitting member having a plurality of segment areas on a base material and in which the plurality of segment areas emit sequentially light rays of different wavelength bands by the light from the primary light source being shone on to the plurality of segment areas;
   a secondary light source which emits a light ray of a wavelength band which is different from that of the light ray emitted from the primary light source and those of the light rays emitted from the light emitting member;
   a light guiding optical system which guides the light rays emitted from the light emitting member and the light ray emitted from the secondary light source to the same optical path; and
   a light source control means which controls the emission of light from the primary light source and the secondary light source individually, wherein
   the light source control means controls the primary light source and the secondary light source to be turned on so that a period of time is included when the light ray from the primary light source is shone on to a predetermined boundary between the adjacent segment areas of the light emitting body when the secondary light source is turned on.

2. A light source unit set forth in claim 1, wherein
   the light emitting member is a luminescent light emitting portion in which at least one of the plurality segment areas has a luminescent material layer which receives the light ray from the primary light source to emit a light ray or a wavelength band which differs from that of the light ray from the primary light source.

3. A light source unit as set forth in claim 1, wherein
   the primary light source is a laser emitter which emits a laser beam of an ultraviolet radiation range.

4. A light source unit as set forth in claim 2, wherein
   the luminescent materials of the luminescent light emitting portion are a luminescent material which receives the light ray from the primary light source to emit at least a light ray of blue wavelength band and a luminescent material which receives the light ray from the primary light source to emit a light ray of green wavelength band.

5. A light source unit as set forth in claim 1, wherein the primary light source is a laser emitter which emits a laser beam of blue wavelength band, and wherein at least one of the plurality of segment areas of the light emitting member is configured as a transmissive portion which transmits the tight ray from the primary light source.

6. A light source unit as set forth in claim 5, wherein the luminescent material which is disposed in one of the plurality of segment areas of the light emitting member is a luminescent material which receives the light ray from the primary light source to emit at least a light ray of green wavelength band.

7. A light source unit as set forth in claim 5, wherein a diffuse layer which diffuses the light ray from the primary light source is formed on the transmissive portion of the light emitting member.

8. A light source unit as set forth in claim 1, wherein at least one of the plurality of segment areas has a luminous light emitting portion and a luminescent material layer of the luminescent light emitting portion is disposed on a transparent base material which transmits a light ray, and wherein the light guiding optical system is such that a dichroic mirror which transmits the light rays from the light emitting member and reflects the light ray from the secondary light source or which reflects the light rays from the light emitting member and transmits the light ray from the secondary light source is disposed in a position where an optical axis of the primary light source and an optical axis of the secondary light source intersect each other.

9. A light source unit as set forth in claim 8, wherein a dichroic layer which transmits the light ray from the primary light source and reflects light rays of other wavelength bands is formed on a surface of the luminescent light emitting portion on which the luminescent material layer is disposed.

10. A light source unit as set forth in claim 1, wherein at least one of the plurality of segment areas has a luminescent light emitting portion, and a base material of the luminescent light emitting portion where the luminescent layers are disposed is a reflecting plate having a reflecting surface which reflects light, and wherein the light guiding optical system has:
a dichroic mirror which is disposed between the primary light source and the light emitting member so as to transmit the light ray from the primary light source while reflecting the luminescent light rays from the luminescent materials; and
pluralities of reflecting mirrors and dichroic mirrors which collect the light ray that passes through the transmissive portion of the light emitting body, the luminescent light rays that are reflected on the dichroic mirror and the light ray that is emitted from the secondary light source to the same optical path and which enables those light rays to be emitted towards the same direction.

11. A light source unit as set forth in claim 1, wherein the secondary light source is a light emitting diode which emits a light ray of red wavelength band.

12. A light source unit as set forth in claim 1, wherein the light emitting member is a luminescent wheel which is made up of a rotation controllable base material.

13. A light source unit as set forth in claim 1, wherein the light emitting member has two semicircular segment areas which are laid to be adjacent to each other, and wherein the light source control means controls the primary and secondary light sources to be turned on so that the light source control means turns on the secondary light source as well when the primary light source is turned on to shine a light ray so that a period of time is included when an illumination area passes through a boundary between the two segment areas at one of boundaries between the two segments, whereby the light source unit emits a light ray that is synthesized from the light rays of two different wavelength bands which are emitted from the light emitting member and the light ray from the secondary light source at the one boundary between the two segments, while the light source control means turns on the secondary light source when the primary light source is turned off so that a non-illumination area passes through the boundary between the two segment areas at the other boundary between the two segments, whereby the light source unit emits only the light ray from the secondary light source.

14. A projector comprising:
the light source unit set forth in claim 1;
a display device;
a light source-side optical system which guides a light ray from the light source unit to the display device;
projection-side optical system which projects an image emitted from the display device on to a screen; and
projector control means which controls the light source unit and the display device.

\* \* \* \* \*

UNITED STATES PATENT AND TRADEMARK OFFICE
CERTIFICATE OF CORRECTION

PATENT NO. : 8,342,697 B2
APPLICATION NO. : 12/882358
DATED : January 1, 2013
INVENTOR(S) : Masakuni Iwanaga et al.

Page 1 of 1

It is certified that error appears in the above-identified patent and that said Letters Patent is hereby corrected as shown below:

Claims

Column 24, Line 54, Claim 2, before "set" insert --as--.

Column 25, Line 9, Claim 5, delete "tight" and insert --light--.

Column 26, Line 45, Claim 14, before "projection" insert --a--.

Column 26, Line 47, Claim 14, before "projector" insert --a--.

Signed and Sealed this
Twenty-ninth Day of December, 2015

Michelle K. Lee
*Director of the United States Patent and Trademark Office*